United States Patent
Xu et al.

(10) Patent No.: US 12,028,756 B2
(45) Date of Patent: Jul. 2, 2024

(54) CELL CONFIGURATION METHOD AND APPARATUS

(71) Applicant: HUAWEI TECHNOLOGIES CO., LTD., Guangdong (CN)

(72) Inventors: Ruiyue Xu, Shanghai (CN); Quan Gan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 614 days.

(21) Appl. No.: 17/213,289

(22) Filed: Mar. 26, 2021

(65) Prior Publication Data

US 2021/0219192 A1   Jul. 15, 2021

Related U.S. Application Data

(63) Continuation of application No. PCT/CN2019/108565, filed on Sep. 27, 2019.

(30) Foreign Application Priority Data

Sep. 27, 2018   (CN) .......................... 201811133832.5

(51) Int. Cl.
*H04W 36/00*   (2009.01)
*H04L 41/0803*   (2022.01)
(Continued)

(52) U.S. Cl.
CPC ..... *H04W 36/0055* (2013.01); *H04L 41/0803* (2013.01); *H04W 36/04* (2013.01); *H04W 36/08* (2013.01)

(58) Field of Classification Search
None
See application file for complete search history.

(56) References Cited

U.S. PATENT DOCUMENTS

| 8,705,501 B2 | 4/2014 | Gupta et al. |
| 2011/0201339 A1 | 8/2011 | Kuningas |

(Continued)

FOREIGN PATENT DOCUMENTS

| CN | 101043716 A | 9/2007 |
| CN | 101541032 A | 9/2009 |
| CN | 101594706 A | 12/2009 |
| CN | 102045689 A | 5/2011 |

(Continued)

OTHER PUBLICATIONS

Itri, Discussion on IAB topology adaptation with Tree and DAG, 3GPP TSG-RAN WG2 Meeting #103, Gothenburg, Sweden, Aug. 20-24, 2018, R2-1812708, 4 pages.

(Continued)

*Primary Examiner* — Christine T Duong

(57) ABSTRACT

Embodiments of this application relate to the field of communications technologies, and in particular, to a cell configuration method and apparatus, to reduce signaling exchange in a cell migration process and improve cell migration efficiency. The cell configuration method includes: A first management function unit obtains a first message, where the first message includes information about a first cell and information about a first base station, the information about the first cell includes at least one of an identifier of the first cell or a managed object identifier of the first cell, and the information about the first base station includes at least one of an identifier of the first base station or a managed object identifier of the first base station; and the first management function unit configures a relationship between the first cell and the first base station based on the first message.

20 Claims, 14 Drawing Sheets

(51) Int. Cl.
*H04W 36/04* (2009.01)
*H04W 36/08* (2009.01)

(56) References Cited

U.S. PATENT DOCUMENTS

| | | | |
|---|---|---|---|
| 2011/0250868 A1 | 10/2011 | Peng et al. | |
| 2013/0003695 A1 | 1/2013 | Nylander et al. | |
| 2013/0044639 A1* | 2/2013 | Wang | H04B 7/155 370/254 |

FOREIGN PATENT DOCUMENTS

| | | | | |
|---|---|---|---|---|
| CN | 102217370 A | 10/2011 | | |
| CN | 102457872 A | 5/2012 | | |
| CN | 103209416 A | 7/2013 | | |
| CN | 104754543 A | 7/2015 | | |
| CN | 106231619 A | 12/2016 | | |
| CN | 107682883 A | 2/2018 | | |
| WO | 2010072125 A1 | 7/2010 | | |
| WO | WO-2010127477 A1 * | 11/2010 | ........... | H04W 24/02 |
| WO | 2014169476 A1 | 10/2014 | | |
| WO | 2016054882 A1 | 4/2016 | | |

OTHER PUBLICATIONS

3GPP TR 38.874 V0.5.0 (Oct. 2018), 3rd Generation Partnership Project; Technical Specification Group Radio Access Network; Study on Integrated Access and Backhaul; (Release 15), 78 pages.
Extended European Search Report issued in EP19865453.5, dated Oct. 18, 2021, 12 pages.
3GPP TSG RAN WG3 Meeting #77bis, R3-122164, Discussion on neighbour cell multiband capability update process, New Postcom,Lecce, Italy, Oct. 8-12, 2012, total 2 pages.
3GPP TSG-RAN3 Meeting #73bis, R3-112542, Clarification on eNB configuration update procedure in relay networks, Potevio,Zhuhai, China, Oct. 10-14, 2011, total 3 pages.
3GPP TSG RAN WG3 #69bis, R3-102739, ANRF for UTRAN, ZTE, China Unicom, Xian, China, Oct. 11-15, 2010, total 7 pages.
Office Action issued in CN201811133832.5, dated May 5, 2022, 9 pages.
Office Action issued in CN Application No. 201811133832.5, dated Oct. 9, 2020 total 10 pages.
Search Report and Written Opinion issued in PCT/CN2019/108565, dated Jan. 8, 2020 total 8 pages.

* cited by examiner

CELL CONFIGURATION METHOD AND APPARATUS

CROSS-REFERENCE TO RELATED APPLICATIONS

This application is a continuation of International Application No. PCT/CN2019/108565, filed on Sep. 27, 2019, which claims priority to Chinese Patent Application No. 201811133832.5, filed on Sep. 27, 2018. The disclosures of the aforementioned applications are hereby incorporated by reference in their entireties.

TECHNICAL FIELD

Embodiments of this application relate to the field of communications technologies, and in particular, to a cell configuration method and apparatus.

BACKGROUND

As a growing quantity of vertical industries are introduced, wireless network structures of operators are increasingly complex, and network operation and maintenance become more difficult. Therefore, it is urgent to rapidly deploy networks to satisfy diversified service requirements, simplify network operation and maintenance processes, and reduce network operation and maintenance costs. Managing a wireless network may be usually understood as managing a communications device (for example, a base station) in the wireless network. A wireless network usually includes many base stations, and one base station may also cover a plurality of cells. It can be learned that there are a large quantity of cells in the wireless network, and neighboring cell relationships between cells are complex. Consequently, cell management is also quite complex.

In practice, an operator can migrate a cell managed by a source base station from the source base station to a destination base station for management. For example, for a cell 1 managed by a base station 1, an operator expects that a base station 2 manages the cell 1, and hence the cell 1 is transferred from the base station 1 to the base station 2 for management. This process may be referred to as migration of the cell 1.

In the prior art, cell migration is implemented in a full configuration manner. To be specific, an operator management system performs, through a configuration interface, at least the following steps to implement the cell migration:

S1: Obtain all configuration information and neighboring cell relationships of a source cell, for example, including an identifier of the source cell, frequency information, or the like, from a vendor management system. S2: Request the vendor management system to create a new cell under a managed object of the destination base station, and configure the configuration information of the source cell into the new cell. S3: According to the neighboring cell relationships of the source cell, request the vendor management system to configure a neighboring cell relationship of the new cell. S4: According to the neighboring cell relationships of the source cell, request the vendor management system to configure an external cell of a destination cell. S5: Request the vendor management system to delete the source cell. S6: Request the vendor management system to configure an external cell of the source cell.

However, if there are a large quantity of cells covered by the source base station and the neighboring cell relationships of the source cell are complex, and an existing configuration mechanism is used, a large quantity of messages need to be exchanged between an operator and a vendor to implement the cell migration. This results in low efficiency. In addition, the operator management system needs to obtain information about all cell relationships. However, descriptions of cell relationships of different vendor management systems are inconsistent. Consequently, the operator management system needs to spend a lot of efforts to configure neighbor cells during a cell migration process.

SUMMARY

Embodiments of this application provide a cell configuration method and apparatus, to reduce signaling exchange in a cell migration process and improve cell migration efficiency.

To achieve the foregoing objective, the embodiments of this application provide the following solutions:

According to a first aspect, an embodiment of this application provides a cell configuration method. The solution includes: A first management function unit obtains a first message. For example, the first management function unit may obtain the first message from an operator server, and the first message may include information about a first cell and information about a first base station. The information about the first cell includes an identifier of the first cell, or the information about the first cell includes a managed object identifier of the first cell, or the information about the first cell includes an identifier of the first cell and a managed object identifier of the first cell. The information about the first base station includes either of an identifier of the first base station and a managed object identifier of the first base station, or the information about the first base station includes an identifier of the first base station and a managed object identifier of the first base station. The first management function unit configures a relationship between the first cell and the first base station based on the first message; or adjusts, based on the first message, configuration information related to the first cell. Alternatively, the first management function unit not only configures a relationship between the first cell and the first base station based on the first message, but also adjusts, based on the first message, configuration information related to the first cell. The first cell is associated with a second base station before being associated with the first base station.

For example, the adjusting configuration information related to the first cell includes: adjusting a neighboring cell relationship associated with the first cell, or adjusting an external cell associated with the first cell. Alternatively, the adjusting configuration information related to the first cell includes: adjusting both a neighboring cell relationship associated with the first cell and an external cell associated with the first cell.

In this embodiment of this application, the first management function unit obtains the information about the first cell and the information about the first base station. In this way, a relationship between the second base station and the first cell may be adjusted to the relationship between the first base station and the first cell based on the information about the first cell and the information about the first base station. In addition, because the first cell further has the external cell and the neighboring cell relationship, in a process of associating the first cell with the first base station, the external cell associated with the first cell and the neighboring cell relationship associated with the first cell can be adjusted. This reduces signaling exchange in a cell migration process and improves efficiency.

In an embodiment, that the first management function unit configures a relationship between the first cell and the first base station based on the first message includes: The first management function unit configures base station information in a managed object of the first cell as the information about the first base station. The base station information in the managed object of the first cell is configured as the information about the first base station, so that the first cell can be associated with the first base station. In addition, this can replace the method of implementing cell migration through a complex configuration interface in the prior art. In this way, the cell migration is faster and more convenient.

In an embodiment, the first management function unit configures the managed object identifier of the first cell as a managed object identifier of a second cell, where the managed object identifier of the second cell includes the information about the first base station. Because the managed object identifier of the second cell includes the information about the first base station, the second cell is associated with the first base station. In this case, the managed object identifier of the first cell is configured as the managed object identifier of the second cell. In this way, the first cell can be associated with the first base station.

In an embodiment, that the first management function unit adjusts, based on the first message, configuration information related to the first cell includes: The first management function unit creates the external cell associated with the first cell; or the first management function unit deletes an external cell associated with a neighbor cell of the first cell; or when the managed object identifier of the second cell includes the information about the first base station, the first management function unit configures the managed object identifier of the second cell for a neighbor cell of the first cell. In this way, the configuration information related to the first cell is rapidly configured.

In an embodiment, the first message further includes update information of the first cell, and the update information of the first cell is used to indicate to update a configuration parameter of the first cell. For example, the update information of the first cell includes any one of four parameters: a cell logical identifier, a physical cell identifier, a frequency, a bandwidth, or a tracking area code, or includes all of the four parameters, or includes at least two of the four parameters. For example, the update information of the first cell includes the cell logical identifier. In this way, the cell logical identifier of the first cell that is obtained after the first cell is associated with the first base station can be updated in time.

In an embodiment, the method provided in this embodiment of this application further includes: The first management function unit configures the update information of the first cell for the first cell. It should be understood that the first management function unit configures the update information of the first cell for the first cell associated with the first base station.

In an embodiment, the method provided in this embodiment of this application further includes: The first management function unit performs one or more of the following steps: configuring update information of the first cell for the first cell; or configuring the update information of the first cell for the neighbor cell associated with the first cell; or configuring the update information of the first cell for the external cell associated with the first cell. In this process, after the first management function unit adjusts the external cell associated with the first cell and the neighboring cell relationship associated with the first cell, the update information of the first cell may be configured for either of the external cell associated with the first cell and the neighbor cell associated with the first cell. It should be understood that, in this process, the first management function unit updates the external cell associated with the first cell and the neighbor cell associated with the first cell that are managed by the first management function unit.

In an embodiment, the first message further includes first indication information, where the first indication information is used to: configure the relationship between the first cell and the first base station, or adjust the configuration information related to the first cell. For example, the first indication information is used to indicate to perform one or more of the following steps: configuring the relationship between the first cell and the first base station; or adjusting the neighboring cell relationship associated with the first cell; or adjusting the external cell associated with the first cell. In this way, after receiving the first message, the first management function unit may determine a function of the information included in the first message. That is, the first management function unit needs to configure the relationship between the first cell and the first base station, adjust the neighboring cell relationship associated with the first cell, or adjust the external cell associated with the first cell.

In an embodiment, the method provided in this embodiment of this application further includes: The first management function unit sends a first notification message to a second management function unit, where the first notification message carries the information about the first cell and at least one of the following information: the managed object identifier of the second cell and the update information of the first cell; and the first notification message is used to indicate to adjust the configuration information related to the first cell, and the adjusting configuration information related to the first cell includes: adjusting the external cell associated with the first cell, or adjusting the neighboring cell relationship associated with the first cell. By sending the first notification message, the second management function unit may adjust the external cell associated with the first cell or the neighboring cell relationship associated with the first cell that is managed by the second management function unit. In this way, the adjusted external cell associated with the first cell or the adjusted neighbor cell associated with the first cell points to the first cell associated with the first base station.

In an embodiment, the first notification message further includes second indication information, where the second indication information is used to indicate to adjust the configuration information related to the first cell. For example, the second indication information is used to indicate the second management function unit to perform one or both of the following steps: adjusting the neighboring cell relationship associated with the first cell; and adjusting the external cell associated with the first cell. By sending the second indication information, after receiving the first notification message, the second management function unit may determine to perform at least one of the following steps: adjusting the neighboring cell relationship associated with the first cell; and adjusting the external cell associated with the first cell.

In an embodiment, the method provided in this embodiment of this application further includes: The first management function unit sends a second notification message to a third management function unit, where the second notification message includes the information about the first cell and the information about the first base station, or the second notification message includes the information about the first cell and the managed object identifier of the second cell; and the second notification message is used to indicate to configure the relationship between the first cell and the first base station, and the third management function unit is configured to manage the first base station. When the first base station is managed by the third management function unit, the third management function unit may associate the first cell with the first base station by sending the second notification message to the third management function unit, and the second cell is associated with the first base station.

In an embodiment, the method provided in this embodiment of this application further includes: The second notification message further includes third indication information, where the third indication information is used to indicate the third management function unit to adjust the configuration information related to the first cell. By sending the third indication information, after receiving the second notification message, the third management function unit may determine to adjust the configuration information related to the first cell. The adjusting configuration information related to the first cell may include: adjusting the neighboring cell relationship associated with the first cell, or adjusting the external cell associated with the first cell.

In an embodiment, the method provided in this embodiment of this application further includes: The first management function unit sends a first response message of the first message, where the first response message is used to indicate that one or more of the following steps have been performed: configuring the relationship between the first cell and the first base station; or adjusting the neighboring cell relationship associated with the first cell; or adjusting the external cell associated with the first cell. The first response message may be sent to indicate to adjust the neighboring cell relationship, or indicate that the external cell associated with the first cell has been adjusted, or indicate that the first cell is configured, the management function unit of the first base station has successfully migrated the first cell to a destination base station, and the external cell and the neighboring cell relationship associated with the first cell after the migration are adjusted.

It should be understood that, in this embodiment of this application, for steps of adjusting the external cell associated with the first cell, adjusting the neighboring cell relationship associated with the first cell, and configuring the relationship between the first cell and the first base station that are performed by the third management function unit after the third management function unit receives the second notification message, refer to steps correspondingly performed by the first management function unit. Details are not repeated herein.

According to a second aspect, an embodiment of this application provides a cell configuration method. The method includes: A second management function unit receives a first notification message, where the first notification message carries information about a first cell, and the information about the first cell includes at least one of an identifier of the first cell or a managed object identifier of the first cell; and the second management function unit adjusts, based on the first notification message, configuration information related to the first cell. Specifically, the adjusting configuration information related to the first cell includes: adjusting a neighboring cell relationship associated with the first cell, or adjusting an external cell associated with the first cell, or adjusting both a neighboring cell relationship associated with the first cell and an external cell associated with the first cell.

In an embodiment, the first notification message further carries at least one of information about a first base station and a managed object identifier of a second cell, and that the second management function unit adjusts, based on the first notification message, configuration information related to the first cell includes: The second management function unit configures the managed object identifier of the second cell for the external cell associated with the first cell; or the second management function unit configures the managed object identifier of the second cell for a neighbor cell of the first cell.

In an embodiment, the first notification message further includes update information of the first cell, and the method provided in this embodiment of this application further includes: The second management function unit updates the configuration information related to the first cell, where the updating the configuration information related to the first cell includes: configuring the update information of the first cell for the external cell associated with the first cell; or configuring the update information of the first cell for the neighbor cell of the first cell, where the update information of the first cell is used to update a parameter of the first cell.

In an embodiment, the update information of the first cell includes at least one of a cell logical identifier, a physical cell identifier, a frequency, a bandwidth, or a tracking area code.

In an embodiment, the first notification message further includes second indication information, used to indicate to adjust the configuration information related to the first cell. The adjusting configuration information related to the first cell includes: adjusting the external cell associated with the first cell; or adjusting the neighboring cell relationship associated with the first cell.

In an embodiment, the method provided in this embodiment of this application further includes: The second management function unit performs, based on the second indication information, one or more of the following steps: adjusting the neighboring cell relationship associated with the first cell, or adjusting the external cell associated with the first cell.

According to a third aspect, an embodiment of this application provides a cell configuration apparatus. The cell configuration apparatus can implement the method described in any one of the first aspect or the embodiments of the first aspect, and therefore can further implement beneficial effects in any one of the first aspect or the embodiments of the first aspect. The cell configuration apparatus may be a first management function unit, or may be an apparatus that can support the first management function unit in implementing the method in any one of the first aspect or the embodiments of the first aspect, for example, a chip used in the first management function unit. The cell configuration apparatus may implement the foregoing method by using software, hardware, or hardware executing corresponding software.

In an example embodiment, the cell configuration apparatus includes: an obtaining unit, configured to obtain a first message, where the first message includes information about a first cell and information about a first base station, the information about the first cell includes at least one of an identifier of the first cell or a managed object identifier of the first cell, and the information about the first base station includes at least one of an identifier of the first base station or a managed object identifier of the first base station; and a processing unit, configured to: configure a relationship between the first cell and the first base station based on the first message; or adjust, based on the first message, configuration information related to the first cell. That the processing unit is configured to adjust configuration information related to the first cell includes: the processing unit is configured to: adjust a neighboring cell relationship associated with the first cell, or adjust an external cell associated with the first cell, where the first cell is associated with a second base station before being associated with the first base station.

In an embodiment, the processing unit is specifically configured to configure base station information in a managed object of the first cell as the information about the first base station; or the processing unit is specifically configured to configure the managed object identifier of the first cell as a managed object identifier of a second cell, where the managed object identifier of the second cell includes the information about the first base station.

In an embodiment, the processing unit is further specifically configured to create the external cell associated with the first cell; or the processing unit is further specifically configured to delete an external cell associated with a neighbor cell of the first cell; or when the managed object identifier of the second cell includes the information about the first base station, the processing unit is further specifically configured to configure the managed object identifier of the second cell for a neighbor cell of the first cell.

In an embodiment, the first message further includes update information of the first cell, and the update information of the first cell includes at least one of a cell logical identifier, a physical cell identifier, a frequency, a bandwidth, or a tracking area code.

In an embodiment, the processing unit is further configured to: configure the update information of the first cell for the managed object of the first cell, or update the configuration information related to the first cell. That the processing unit is configured to update the configuration information related to the first cell includes: the processing unit is configured to: configure the update information of the first cell for the neighbor cell associated with the first cell, or configure the update information of the first cell for the external cell associated with the first cell. Alternatively, that the processing unit is configured to update the configuration information related to the first cell includes: the processing unit is configured to: configure the update information of the first cell for both the neighbor cell associated with the first cell and the external cell associated with the first cell.

In an embodiment, the first message further includes first indication information, where the first indication information is used to indicate to: configure the relationship between the first cell and the first base station, or adjust the configuration information related to the first cell.

In an embodiment, the cell configuration apparatus further includes: a sending unit, configured to send a first notification message to a second management function unit, where the first notification message carries the information about the first cell and at least one of the following information: the managed object identifier of the second cell and the update information of the first cell. It should be understood that the first notification message may carry only the information about the first cell and the management object identifier of the second cell, or carry only the update information of the first cell and the update information of the first cell, or carry all the three parameters. The first notification message is used to indicate to adjust the configuration information related to the first cell. That the processing unit is configured to adjust configuration information related to the first cell includes: the processing unit is configured to: adjust the external cell associated with the first cell, or adjust the neighboring cell relationship associated with the first cell.

In an embodiment, the method provided in this embodiment of this application further includes: The first notification message further includes second indication information, where the second indication information is used to indicate the second management function unit to adjust the configuration information related to the first cell. For example, the second indication information is used to indicate to adjust the neighboring cell relationship associated with the first cell or the external cell associated with the first cell. It should be understood that the second indication information is used to indicate to adjust the neighboring cell relationship associated with the first cell and adjust the external cell associated with the first cell. Alternatively, the second indication information is used to indicate to adjust the neighboring cell relationship associated with the first cell. Alternatively, the second indication information is used to indicate to adjust the external cell associated with the first cell. By sending the second indication information, after receiving the first notification message, the second management function unit may determine to adjust the neighboring cell relationship associated with the first cell or the external cell associated with the first cell.

In an embodiment, the sending unit is further configured to send a second notification message to a third management function unit, where the second notification message includes the information about the first cell and the information about the first base station, or the second notification message includes the information about the first cell and the managed object identifier of the second cell; and the second notification message is used to indicate to configure the relationship between the first cell and the first base station, the third management function unit is configured to manage the first base station, and the second cell is associated with the first base station.

In an embodiment, the sending unit is further configured to send third indication information to the third management function unit, where the third indication information is used to indicate the third management function unit to adjust the neighboring cell relationship of the first cell, for example, adjust the external cell associated with the first cell, or adjust the neighboring cell relationship associated with the first cell, or adjust both.

In an embodiment, the sending unit is further configured to send a first response message of the first message, where the first response message is used to indicate that the relationship between the first cell and the first base station has been configured, or the configuration information related to the first cell has been adjusted.

In another embodiment, an embodiment of this application further provides a cell configuration apparatus. The cell configuration apparatus may be a first management function unit or a chip used in a first management function unit. The cell configuration apparatus includes a processor and a communications interface. The communications interface is configured to support the cell configuration apparatus in performing the steps of receiving and sending a message/data on a cell configuration apparatus side described in any one of the first aspect or the embodiments of the first aspect. The processor is configured to support the cell configuration apparatus in performing the steps of processing the message/data on the cell configuration apparatus side in any one of the first aspect or the embodiments of the first aspect. For specific corresponding steps, refer to the descriptions in any one of the first aspect or the embodiments of the first aspect. Details are not repeated herein.

Optionally, the cell configuration apparatus may further include a memory, configured to store code and data. The processor, the communications interface, and the memory are coupled to each other.

According to a fourth aspect, an embodiment of this application provides a cell configuration apparatus. The cell configuration apparatus can implement the method described in any one of the second aspect or the embodiments of the second aspect, and therefore can further implement beneficial effects in any one of the second aspect or the embodiments of the second aspect. The cell configuration apparatus may be a second management function unit, or may be an apparatus that can support the second management function unit in implementing the method in any one of the second aspect or the embodiments of the second aspect, for example, a chip used in the second management function unit. The cell configuration apparatus may implement the foregoing method by using software, hardware, or hardware executing corresponding software.

In an embodiment, the cell configuration apparatus includes a receiving unit and a processing unit. The receiving unit is configured to receive a first notification message, where the first notification message carries information about a first cell, and the information about the first cell includes at least one of an identifier of the first cell or a managed object identifier of the first cell. The processing unit is configured to adjust, based on the first notification message, configuration information related to the first cell, where that the processing unit is configured to adjust configuration information related to the first cell includes: the processing unit is configured to: adjust a neighboring cell relationship associated with the first cell, or adjust an external cell associated with the first cell.

In an embodiment, the first notification message further carries at least one of information about a first base station and a managed object identifier of a second cell, and the processing unit is specifically configured to configure the managed object identifier of the second cell for the external cell associated with the first cell; or the processing unit is specifically configured to configure the managed object identifier of the second cell for a neighbor cell associated with the first cell.

In an embodiment, the first notification message further includes update information of the first cell, and the processing unit is further configured to update the configuration information related to the first cell, where that the processing unit is configured to update the configuration information related to the first cell includes: the processing unit is configured to: configure the update information of the first cell for the external cell associated with the first cell; or configure the update information of the first cell for the neighbor cell of the first cell, where the update information of the first cell is used to update a parameter of the first cell.

In an embodiment, the update information of the first cell includes at least one of a cell logical identifier, a physical cell identifier, a frequency, a bandwidth, or a tracking area code.

In an embodiment, the first notification message further includes second indication information; the processing unit is further configured to indicate, based on the second indication information, to adjust the configuration information related to the first cell; and that the processing unit is configured to adjust configuration information related to the first cell includes: the processing unit is configured to: adjust the external cell associated with the first cell, or adjust the neighboring cell relationship associated with the first cell.

In another embodiment, an embodiment of this application further provides a cell configuration apparatus. The cell configuration apparatus may be a second management function unit or a chip used in a second management function unit. The cell configuration apparatus includes a processor and a communications interface. The communications interface is configured to support the cell configuration apparatus in performing the steps of receiving and sending a message/data on a cell configuration apparatus side described in any one of the second aspect or the embodiments of the second aspect. The processor is configured to support the cell configuration apparatus in performing the steps of processing the message/data on the cell configuration apparatus side in any one of the second aspect or the embodiments of the second aspect. For specific corresponding steps, refer to the descriptions in any one of the second aspect or the embodiments of the second aspect. Details are not repeated herein.

Optionally, the cell configuration apparatus may further include a memory, configured to store code and data. The processor, the communications interface, and the memory are coupled to each other.

According to a fifth aspect, an embodiment of this application provides a computer-readable storage medium. The computer-readable storage medium stores instructions. When the instructions are run on a computer, the computer is enabled to perform the cell configuration method described in the first aspect or the embodiments of the first aspect.

According to a sixth aspect, an embodiment of this application provides a computer-readable storage medium. The computer-readable storage medium stores instructions. When the instructions are run on a computer, the computer is enabled to perform the cell configuration method described in the second aspect or the embodiments of the second aspect.

According to a seventh aspect, an embodiment of this application provides a computer program product including instructions. When the instructions are run on a computer, the computer is enabled to perform the cell configuration method described in the first aspect or the embodiments of the first aspect.

According to an eighth aspect, an embodiment of this application provides a computer program product including instructions. When the instructions are run on a computer, the computer is enabled to perform the cell configuration method described in the second aspect or the embodiments of the second aspect.

According to a ninth aspect, an embodiment of this application provides a chip. The chip includes a processor and an interface circuit. The interface circuit is coupled to the processor. The processor is configured to run a computer program or instructions, to implement the cell configuration method described in the first aspect or the embodiments of the first aspect. The interface circuit is configured to communicate with a module other than the chip.

According to a tenth aspect, an embodiment of this application provides a chip. The chip includes a processor and an interface circuit. The interface circuit is coupled to the processor. The processor is configured to run a computer program or instructions, to implement the cell configuration method described in the second aspect or the embodiments of the second aspect. The interface circuit is configured to communicate with a module other than the chip.

Specifically, the chip provided in this embodiment of this application further includes a memory, configured to store the computer program or the instructions.

According to an eleventh aspect, an embodiment of this application provides cell configuration. The cell configuration includes one or more modules, configured to implement the first aspect and the second aspect. The one or more modules may correspond to the steps of the methods in the first aspect and the second aspect.

According to a twelfth aspect, an embodiment of this application provides a communications system. The communications system includes the cell configuration apparatus described in the embodiments of the third aspect and the cell configuration apparatus described in the embodiments of the fourth aspect.

Any apparatus, computer storage medium, computer program product, chip, or communications system provided above is configured to perform the corresponding method provided above. Therefore, for beneficial effects that can be achieved by the apparatus, computer storage medium, computer program product, chip, or communications system provided above, refer to beneficial effects of a corresponding solution in the corresponding method provided above. Details are not repeated herein.

DESCRIPTION OF EMBODIMENTS

Before embodiments of this application are described, terms used in the embodiments of this application are explained.

(1) A cell is also referred to as a cellular cell and refers to an area covered by an access network device or a part of antennas of an access network device in a cellular mobile communications system. In this area, a terminal may reliably communicate with the access network device through a wireless channel. The access network device in the embodiments of this application may be a base station, a relay node (RN), an integrated access and backhaul (IAB) node, or the like. The following uses an example in which the access network device is the base station to describe a method provided in the embodiments of this application. In other words, the base station in the following may be replaced with the access network device.

(2) A neighbor cell may be referred to as two cells with overlapping coverage and set with a handover relationship, and one cell may have a plurality of neighbor cells. In a movement state, a terminal may perform a smooth handover of a service between the neighbor cells, to ensure that an ongoing service is not interrupted. For example, only after a neighbor cell is added, adjacent cell terminal can be handed over between different networks (for example, a global system for mobile communications (GSM), a universal mobile telecommunications system (UMTS), long term evolution (LTE), and new radio (NR)).

(3) An external cell is information in a base station. The information is used to describe a cell covered by another base station and adjacent to a cell of the base station, and the information may be used by a terminal for cell handover. The another base station and the base station may be managed by one base station management unit, or may be managed by different base station management units.

(4) A neighboring cell relationship is used to indicate that two cells are neighbor cells. One of the two cells is a source cell, and the other one is a target cell. The neighboring cell relationship is included in the source cell, and is used to describe the target cell associated with the source cell. The neighboring cell relationship is a neighboring cell relationship of the source cell.

Figure 1:
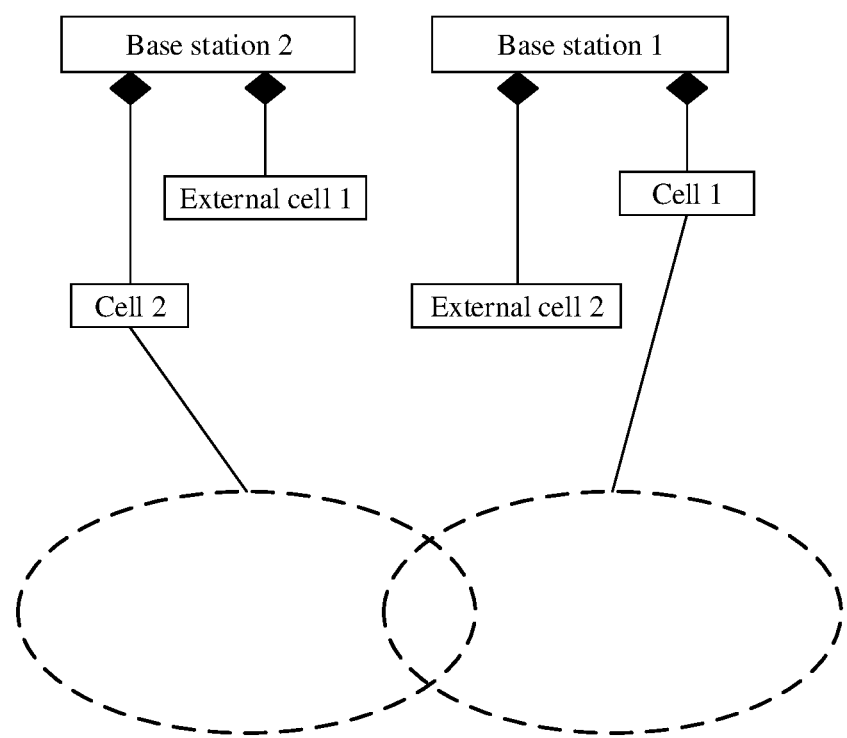
FIG. 1 is a schematic structural diagram of a cell according to an embodiment of this application.

For example, as shown in FIG. 1, a cell 1 and a cell 2 are neighbor cells, and an external cell 2 is an external cell of a base station 1. The external cell 2 is used to describe the cell 2, and the external cell 2 may include information, for example, an identifier of the cell 2, a frequency of the cell 2, an identifier of a base station 2, or the like, that needs to be used when a terminal performs cell handover.

The technical solutions in the embodiments of this application may be used in various communications systems, for example, a global system for mobile communications (GSM) system, an evolved universal terrestrial radio access (E-UTRA) system, a universal mobile telecommunications system (UMTS) system and an evolved release of UMTS, a long term evolution (LTE) system and various releases based on LTE evolution, a fifth generation (5th-generation, 5G) communications system, and a next generation communications system, for example, a new radio (NR) communications system. In addition, the communications system is further applicable to a future-oriented communications technology, and is applicable to the technical solutions provided in the embodiments of this application.

It should be noted that in the embodiments of this application, the word such as "example" or "for example" is used to represent giving an example, an illustration, or a description. Any embodiment or design scheme described as an "example" or "for example" in the embodiments of this application should not be explained as being more preferred or having more advantageous than another embodiment or design scheme. Exactly, use of the word such as "example" or "for example" is intended to present a related concept in a specific manner.

In this application, "at least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" usually represents an "or" relationship between the associated objects. "At least one (piece) of the following" or a similar expression thereof means any combination of these items, including any combination of singular items (pieces) or plural items (pieces). For example, at least one (piece) of a, b, or c may represent a; b; c; a and b; a and c; b and c; or a, b, and c, where a, b, and c may be in a singular or plural form. In the embodiments of this application, A and/or B may represent a case in which only A exists, both A and B exist, and only B exists, where A and B may be singular or plural.

In addition, for convenience of clear description of the technical solutions in this application, in the embodiments of this application, terms such as "first" and "second" are used to distinguish between same items or similar items that have basically the same functions or purposes. A person skilled in the art may understand that the terms such as "first" and "second" do not intend to limit a quantity or an execution sequence, and the terms such as "first" and "second" do not indicate a definite difference.

A system architecture and a service scenario described in the embodiments of this application are intended to describe the technical solutions in this application more clearly, and do not constitute a limitation on the technical solutions provided in this application. A person of ordinary skill in the art may know that the technical solutions provided in this application can also be used for similar technical problems as a network architecture evolves and a new service scenario emerges.

Figure 2:
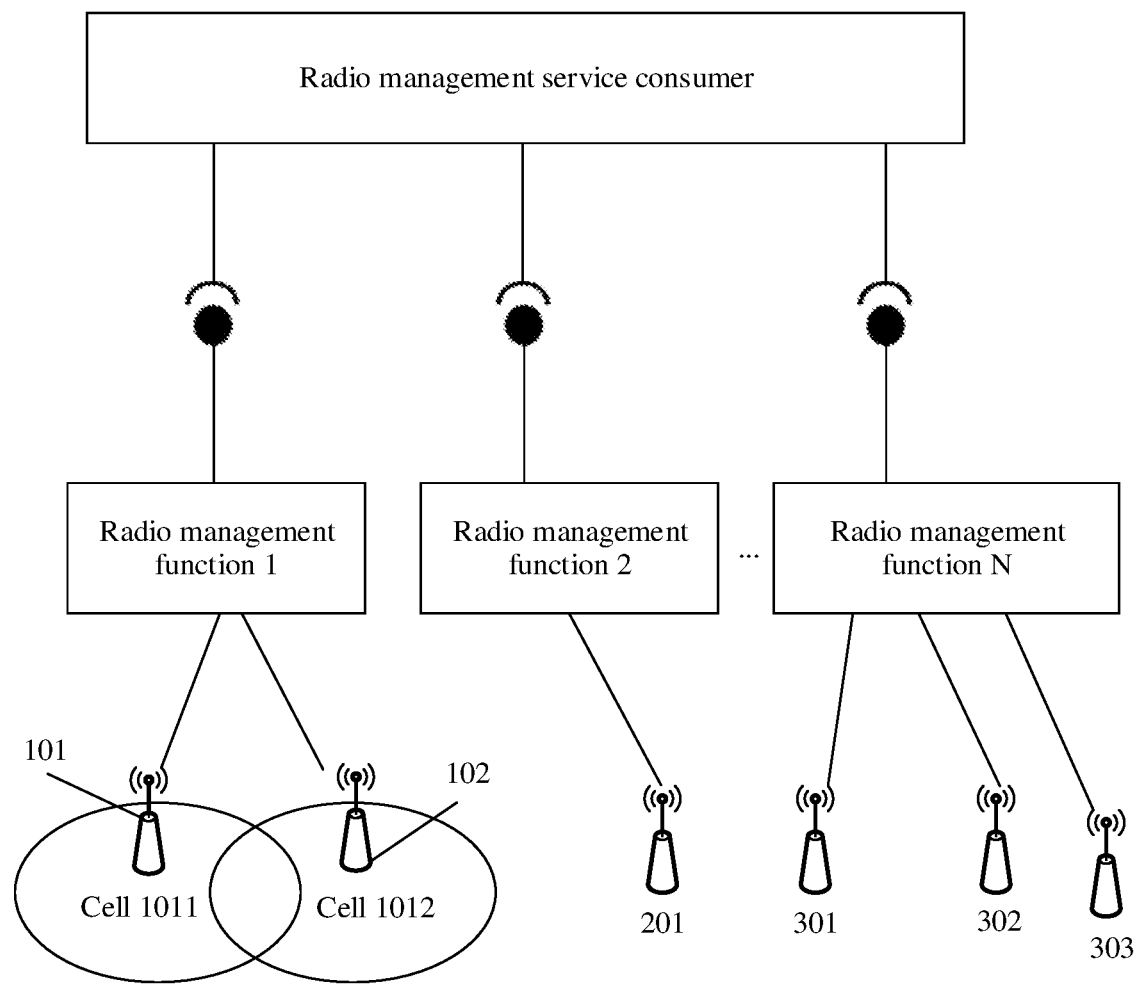
FIG. 2 is a schematic structural diagram of a communications system according to an embodiment of this application.

FIG. 2 shows a communications system according to an embodiment of this application. The communications system includes a radio management service consumer (radio access network (RAN) management service (MS) consumer) and N radio management functions (RAN MF) that communicate with the radio management service consumer. N is an integer greater than or equal to 1.

The RAN MS consumer may be an operator device, the RAN MF may be an equipment vendor device, and base stations managed by different RAN MFs may be base stations of different vendors.

The RAN MF may also be referred to as a radio management function, a base station management unit, a base station management function, or the like. The RAN MS may also be referred to as a radio management service, a base station management service, or the like. In the following descriptions, the RAN MF is referred to as a management function unit, and the RAN MS consumer is referred to as a base station management service consumer. For ease of description, in the following descriptions, a RAN MF corresponding to a first cell is denoted as a first management function unit, a RAN MF corresponding to a first base station is denoted as a second management function unit, and a radio management service consumer is denoted as a fourth management function unit.

As shown in FIG. 2, each RAN MF may manage one or more base stations. For example, a RAN MF 1 manages a base station 101 and a base station 102. A RAN MF 2 manages a base station 201. A RAN MF 3 manages a base station 301, a base station 302, and a base station 303.

It should be understood that a quantity of base stations managed by each RAN MF in FIG. 2 may be larger than that shown in FIG. 2, or may be smaller than that shown in FIG. 2.

Each base station may cover one or more cells. For example, the base station 101 covers a cell 1011, and the base station 102 covers a cell 1012.

It should be understood that, in FIG. 2, a cell covered by the base station 101 and a cell covered by the base station 102 are used as an example. In an actual process, each base station may cover more than one cell.

The RAN MF mainly provides RAN management services externally, including a life cycle management service, a configuration management service, a fault management service, a performance management service, and the like.

The radio management service consumer mainly uses management functions of the RAN management services. The management function may be a RAN management function or a network management function (Network MF). The network management function herein may be a network slice management function (NSMF) or a network slice subnet management function (NSSMF).

The NSMF is responsible for entire life cycle management such as creation, activation, running, deactivation, and deletion of a network slice instance (NSI). In a running phase of the network slice instance, the NSMF creates a performance measurement job for the network slice instance, sets a performance measurement threshold, receives performance measurement data, and receives a notification indicating that performance measurement exceeds the threshold. The performance measurement job includes measurement of a key service indicator of the network slice instance and measurement of a virtual resource (VR) used by the network slice instance.

Specifically, one network slice includes several parts such as a radio access network, a transport network, and a core network. Each part may be considered as one network slice subnet. Correspondingly, there is one network slice subnet management function (NSSMF) responsible for managing the network slice subnet. In this specification, the NSMF and the NSSMF may be collectively referred to as a network slice management function NSMF, and are not specifically distinguished.

A terminal is a device that provides a user with voice and/or data connectivity. For example, the terminal may be a handheld device or a vehicle-mounted device with a wireless connection function. The terminal may also be referred to as user equipment (UE), an access terminal, a user unit, a user station, a mobile station, a remote station, a remote terminal, mobile equipment, a user terminal, wireless telecom equipment, a user agent, user equipment, or a user apparatus. The terminal may be a station (STA) in a wireless local area network (WLAN), or may be a cellular phone, a cordless phone, a session initiation protocol (SIP) phone, a wireless local loop (WLL) station, a personal digital assistant (PDA) device, a handheld device with a wireless communication function, a computing device or another processing device connected to a wireless modem, a vehicle-mounted device, a wearable device, a terminal in a next generation communications system (for example, a 5th generation (5G) communications network), a terminal in a future evolved public land mobile network (PLMN), or the like. 5G may also be referred to as new radio (NR).

Figure 3:
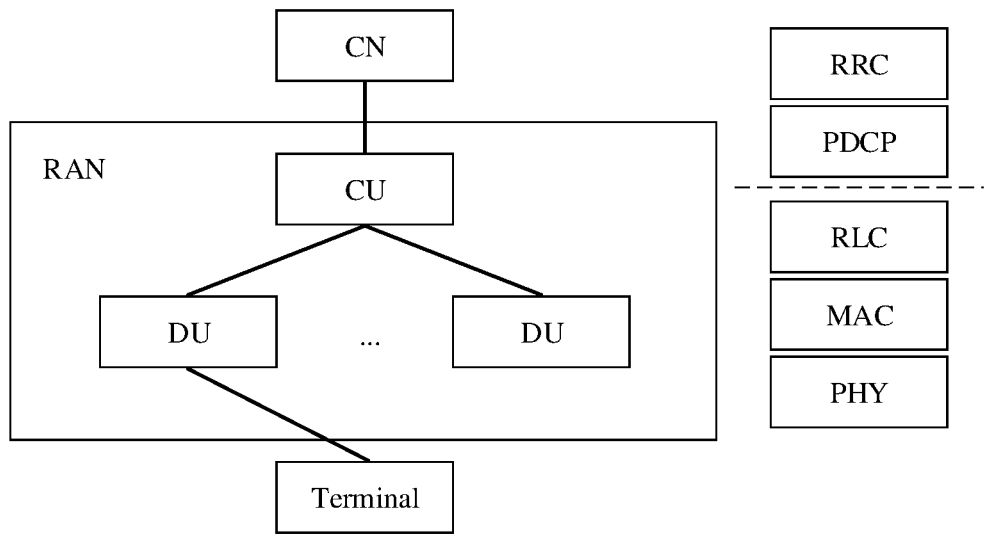
FIG. 3 is a schematic structural diagram 1 of a base station according to an embodiment of this application.

In some embodiments of this application, the terminal may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that can be directly worn by a user or integrated into clothes or an accessory of a user. The wearable device is not only a hardware device, but is used to implement powerful functions through software support, data exchange, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs A future base station may be implemented by using a cloud radio access network (C-RAN) architecture. In an embodiment, an architecture and a function of a protocol stack of a conventional base station are divided into two parts. One part is referred to as a central unit (CU), and the other part is referred to as a distributed unit (DU). As shown in FIG. 2, CU parts of a plurality of base stations are integrated together to form a function entity with a relatively large scale. A plurality of DUs may be controlled by one CU in a centralized manner. As shown in FIG. 3, the CU and the DU may be divided based on protocol layers of a wireless network. For example, functions of a packet data convergence protocol (PDCP) layer and a protocol layer above the PDCP layer (for example, a radio resource control (RRC) layer) are set on the CU. Functions of protocol layers below the PDCP layer, such as a radio link control (RLC) layer, a medium access control (MAC) layer, and a physical layer (PHY), are set on the DU.

It may be understood that division based on the protocol layer shown in FIG. 3 is merely an example, and division may alternatively be performed at another protocol layer. For example, division is performed at an RLC layer. Functions of the RLC layer and a protocol layer above the RLC layer are set on the CU, and a function of a protocol layer below the RLC layer is set on the DU. Alternatively, division is performed at a protocol layer. For example, a part of functions of the RLC layer and a function of a protocol layer above the RLC layer are set on the CU, and a remaining function of the RLC layer and a function of a protocol layer below the RLC layer are set on the DU. In addition, division may alternatively be performed in another manner. For example, division is performed based on a latency. A function whose processing time needs to satisfy a latency requirement is set on the DU, and a function whose processing time does not need to satisfy the latency requirement is set on the CU. This is not limited in the embodiments of the present disclosure.

Figure 4:
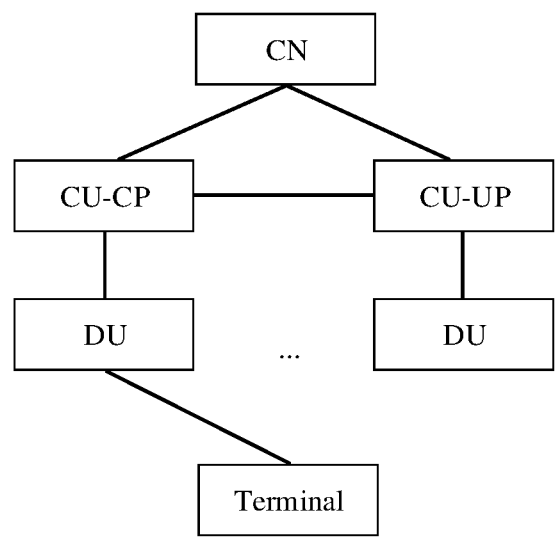
FIG. 4 is a schematic structural diagram 2 of a base station according to an embodiment of this application.

In addition, still referring to FIG. 4, in comparison with the architecture shown in FIG. 3, a control plane (CP) and a user plane (UP) of the CU may alternatively be separated into different entities for implementation, and the different entities are a control plane CU entity (CU-CP entity) and a user plane CU entity (CU-UP entity).

In the foregoing network architecture, data generated by the CU may be sent to a terminal through the DU, or data generated by a terminal may be sent to the CU through the DU. The DU may directly encapsulate the data at a protocol layer and then transmit encapsulated data to the terminal or the CU, without parsing the data. For example, data at an RRC layer or a PDCP layer is finally processed as data at a physical layer (PHY) and sent to the terminal, or is converted from received data at a PHY layer. In this architecture, the data at the RRC layer or the PDCP layer may also be considered to be sent by the DU.

In the foregoing embodiment, the CU is classified as a base station in a RAN. In addition, the CU may alternatively be classified as a base station in a core network CN. This is not limited in embodiments of the present disclosure.

An apparatus in the following embodiments of this application may be located in a terminal or base station based on functions implemented by the apparatus. When the foregoing CU-DU structure is used, the base station may be a CU node, a DU node, or a RAN device including functions of a CU node and a DU node.

Figure 5:
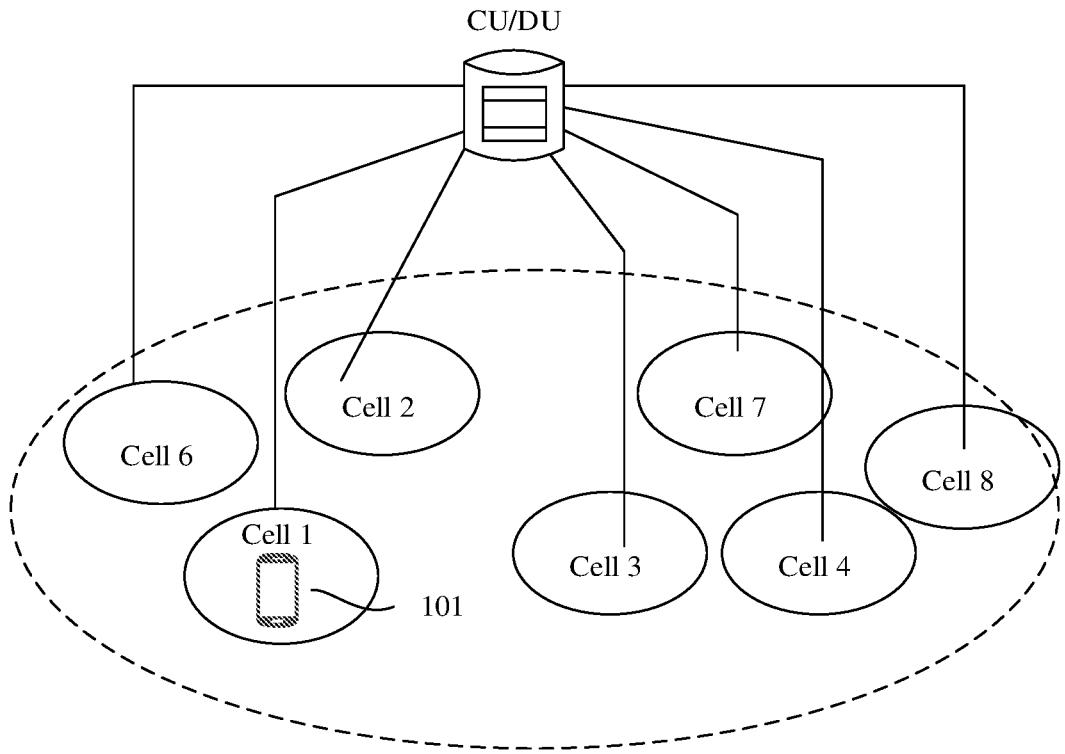
FIG. 5 is a schematic structural diagram 3 of a base station according to an embodiment of this application.

It may be understood that, when the base station may be classified as a CU or a DU, as shown in FIG. 5, that one access network device covers one or more cells may mean that the CU of the access network device covers one or more cells, or may mean that the DU of the base station covers one or more cells. As shown in FIG. 5, cells covered by the CU or the DU may be a cell 1 to a cell 4, and a cell 6 to a cell 8.

The base station in the embodiments of this application may be a base station in 2G, 3G, 4G, 5G, or a future mobile communications system. Because communications systems to which base stations belong are different, network standards and types corresponding to the base stations are different, and types of cells covered by the base stations are also different. Therefore, that network standards corresponding to base stations are long time evolution (LTE) and new radio (NR) are separately used as examples for description in the following:

It should be understood that when a base station is located in an LTE system (which may also be referred to as an evolved universal terrestrial radio access network (E-UTRAN)), a network standard corresponding to the base station is LTE, and LTE may also be referred to as a 4G network. In the embodiments of this application, a base station in a 4G network or an LTE network may be referred to as an eNodeB. When a base station is located in an NR system, a network standard corresponding to the base station is NR, and NR may also be referred to as a 5G network. In the embodiments of this application, a base station in a 5G network or an NR network may be referred to as a gNodeB. For descriptions related to these in the following embodiments, refer to the descriptions herein. Details are not repeated below.

For example, when a base station is located in an E-UTRAN, the base station is an evolved NodeB (eNB). Therefore, a cell covered by the base station in the E-UTRAN may be referred to as an E-UTRAN cell.

When a base station is located in NR, the base station is a next generation base station or a gNodeB (Generation Node Base Station, gNB). Therefore, a cell covered by the base station in NR may be referred to as an NR cell.

When a base station is any one of a next generation base station or gNodeB central unit (Generation Node Base Station Centralized Unit, gNBCU), a next generation base station or gNodeB central unit control plane (Generation Node Base Station Centralized Unit Control Plane, gNB- CUCP), or a next generation base station or gNodeB central unit user plane (Generation Node Base Station Centralized Unit user plane, gNBCUUP), a cell covered by the base station may be an NRCellCU.

When a base station is any one of a next generation base station or gNodeB distributed unit (Generation Node Base Station Distributed Unit, gNBDU), a next generation base station or gNodeB distributed unit control plane (Generation Node Base Station Distributed Unit Control Plane, gNB-CUCP), or a next generation base station or gNodeB distributed unit user plane (Generation Node Base Station Distributed Unit user plane, gNBCUUP), a cell covered by the base station may be an NRCellDU.

It should be noted that the base station in the embodiments of this application may also be referred to as a base station function. For example, the eNB may also be referred to as an eNB function. The gNB may also be referred to as a gNB function. The gNBCU may also be referred to as a gNBCU function. The gNBCUCP may also be referred to as a gNBCUCP function. The gNBDU may also be referred to as a gNBDU function.

A cell configuration apparatus method in the embodiments of this application may be performed by a cell configuration apparatus. The cell configuration apparatus may be a first management function unit, or may be a chip used in a first management function unit. In the following embodiments, an example in which an entity for performing a cell configuration method is a first management function unit is used. For an entity for performing another method, same descriptions are provided. Details are not repeated below.

Embodiment 1

Figure 6:
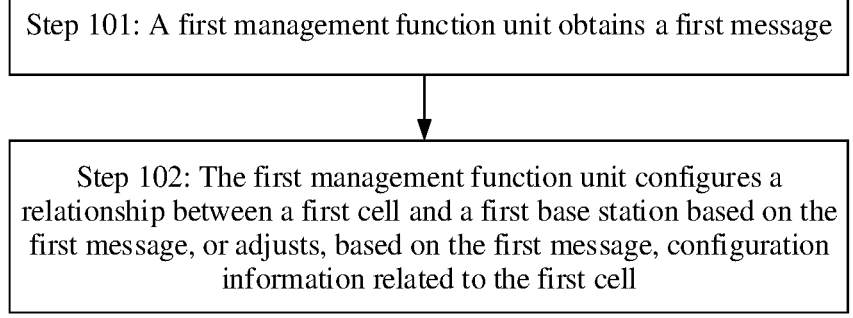
FIG. 6 is a schematic flowchart 1 of a cell configuration method according to an embodiment of this application.

FIG. 6 is a schematic diagram of a cell configuration apparatus method according to an embodiment of this application. The method includes the following steps.

Step 101: A first management function unit obtains a first message, where the first message includes information about a first cell and information about a first base station.

The information about the first cell includes at least one of an identifier of the first cell or a managed object identifier of the first cell. The information about the first base station includes at least one of an identifier of the first base station or a managed object identifier of the first base station. The information about the first base station is used to determine a base station associated with the first cell, and the first cell is associated with a second base station before being associated with the first base station.

It should be understood that, before the first cell is associated with the second base station, the identifier of the first cell is an identifier of the first cell covered by the second base station, and is used to identify the first cell. Specifically, for the identifier of the first cell, refer to a logical identifier of the cell described below.

The managed object identifier of the first cell is used to identify a managed object of the first cell, and the managed object of the first cell is used to describe the information about the first cell. For example, the information about the first cell may be management information of the first cell, including a frequency, a bandwidth, a PCI, or the like of the cell.

Specifically, the managed object identifier of the first cell may be determined based on a type and a managed object instance (MOI) ID/distinguish name of the first cell. For example, when the first cell is an EutranCell, the managed object identifier of the first cell is an EutranCell managed object instance (MOI) ID/distinguish name. When the first cell is an NRCell, the managed object identifier of the first cell is an NRCell MOI ID/distinguish name. When the first cell is an NRCellCU, the managed object identifier of the first cell is an NRCellCU MOI ID/distinguish name. When the first cell is an NRCellDU, the managed object identifier of the first cell is an NRCellDU MOI ID/distinguish name. For descriptions related to the managed object identifier of the cell in the following, refer to the descriptions herein. Details are not repeated below.

It should be noted that, in this embodiment of this application, an EutranCell MOI may also be referred to as an instance of an EutranCell information object class Instance of EutranCell (Information Object Class, IOC). An NRCell MOI may also be referred to as an instance of an NRCell IOC. Similarly, for an NRCellCU MOI and an NRCellDU MOI, same descriptions are provided.

For example, the managed object identifier of the first base station is used to identify the managed object of the first base station. It should be understood that the identifier of the first base station is used to identify the first base station.

It should be understood that the managed object identifier of the first base station may be replaced with information about a second cell, and the second cell is associated with the first base station.

The information about the second cell includes at least one of a managed object identifier of the second cell and the identifier of the first base station. The managed object identifier of the second cell includes the managed object identifier of the first base station. For example, the managed object identifier of the second cell may be the managed object of the first base station plus a managed object identifier of a unique cell covered by the first base station.

Because network standards of base stations are different, names of the managed object identifier of the first base station and the identifier of the base station are different. These are separately described in the following:

Specifically, the managed object identifier of the first base station may be determined based on a type and a managed object instance (MOI) ID/distinguish name of a base station using a network standard that the first base station uses. For example, when the first base station is an eNB, the managed object identifier of the first base station is an eNB MOI ID/distinguish name, and the identifier of the first base station is an eNB ID. When the first base station is a gNB, the managed object identifier of the first base station is a gNB MOI ID/distinguish name, and the identifier of the first base station is a gNB ID. When the first base station is a gNBCU, the managed object identifier of the first base station is a gNBCU MOI ID/distinguish name, and the identifier of the first base station is a gNB ID. When the first base station is a gNBCUCP, the managed object identifier of the first base station is a gNBCUCP MOI ID/distinguish name, and the identifier of the first base station is a gNB ID. When the first base station is a gNBCUUP, the managed object identifier of the first base station is a gNBCUUP MOI ID/distinguish name, and the identifier of the first base station is a gNB ID. When the first base station is a gNBDU, the managed object identifier of the first base station is a gNBDU MOI ID/distinguish name, and the identifier of the first base station is a gNB ID.

It should be noted that, in this embodiment of this application, an eNB MOI may also be referred to as an instance of an eNB IOC or an instance of an eNB function IOC. A gNB MOI may also be referred to as an instance of a gNB IOC or an instance of a gNB function IOC. For a gNBCU MOI, a gNBCUCP MOI, a gNBCUUP MOI, and a gNBDU MOI, same descriptions are provided. Details are not repeated below.

It should be understood that the second base station to which the first cell belongs and a second base station are different base stations. For example, as shown in FIG. 2, a first cell is a cell 1011, a second base station to which the first cell belongs is a base station 101, and a second base station may be a base station 102 or a base station 201.

For example, the first management function unit may be a RAN MF shown in FIG. 2.

Step 102: The first management function unit configures a relationship between the first cell and the first base station based on the first message, or adjusts, based on the first message, configuration information related to the first cell, where the adjusting configuration information related to the first cell includes: adjusting a neighboring cell relationship associated with the first cell; or adjusting an external cell associated with the first cell, where the first cell is associated with the second base station before being associated with the first base station.

It should be understood that the first management function unit may configure the relationship between the first cell and the first base station based on the first message, and adjust, based on the first message, the configuration information related to the first cell. Alternatively, the first management function unit configures the relationship between the first cell and the first base station. Alternatively, the first management function unit adjusts the configuration information related to the first cell. When adjusting the configuration information related to the first cell, the first management function unit may adjust the external cell associated with the first cell and adjust the neighboring cell relationship associated with the first cell, or adjust the external cell associated with the first cell or the neighboring cell relationship associated with the first cell.

It should be understood that, in this embodiment of this application, after configuring the relationship between the first cell and the first base station, the first management function unit may associate the first cell with the first base station. Then, there is no relationship between the first cell and the second base station. In other words, the first cell is a cell covered by the first base station, and is provided by the first base station. For example, before associating the first cell with the first base station, a terminal communicates with a second base station through the first cell. After associating the first cell with the second base station, the terminal communicates with the first base station through the first cell. In this embodiment of this application, the second base station is a base station associated with the first cell before the first cell is associated with the first base station.

On the one hand, the first base station and the second base station to which the first cell belongs may be managed by a same management function unit. For example, both the first base station and the second base station to which the first cell belongs are managed by a first management function unit.

On the other hand, the first base station and the second base station originally associated with the first cell may be managed by different management function units. For example, the first base station is managed by a third management function unit, and the second base station is managed by a first management function unit. In different cases, manners of obtaining the first message by the first management function unit are different. When the second base station and the first base station are managed by different management function units, the neighboring cell relationship associated with the first cell or the external cell associated with the first cell may be adjusted by a management function unit corresponding to the second base station, and a management function unit corresponding to the first base station may perform the step of configuring the first cell on the first base station. Therefore, these are separately described below.

It should be understood that the first cell in this embodiment of this application may be any one of the cells described above.

Scenario 1: For example, a second base station and a first base station are managed by a first management function unit.

Figure 7:
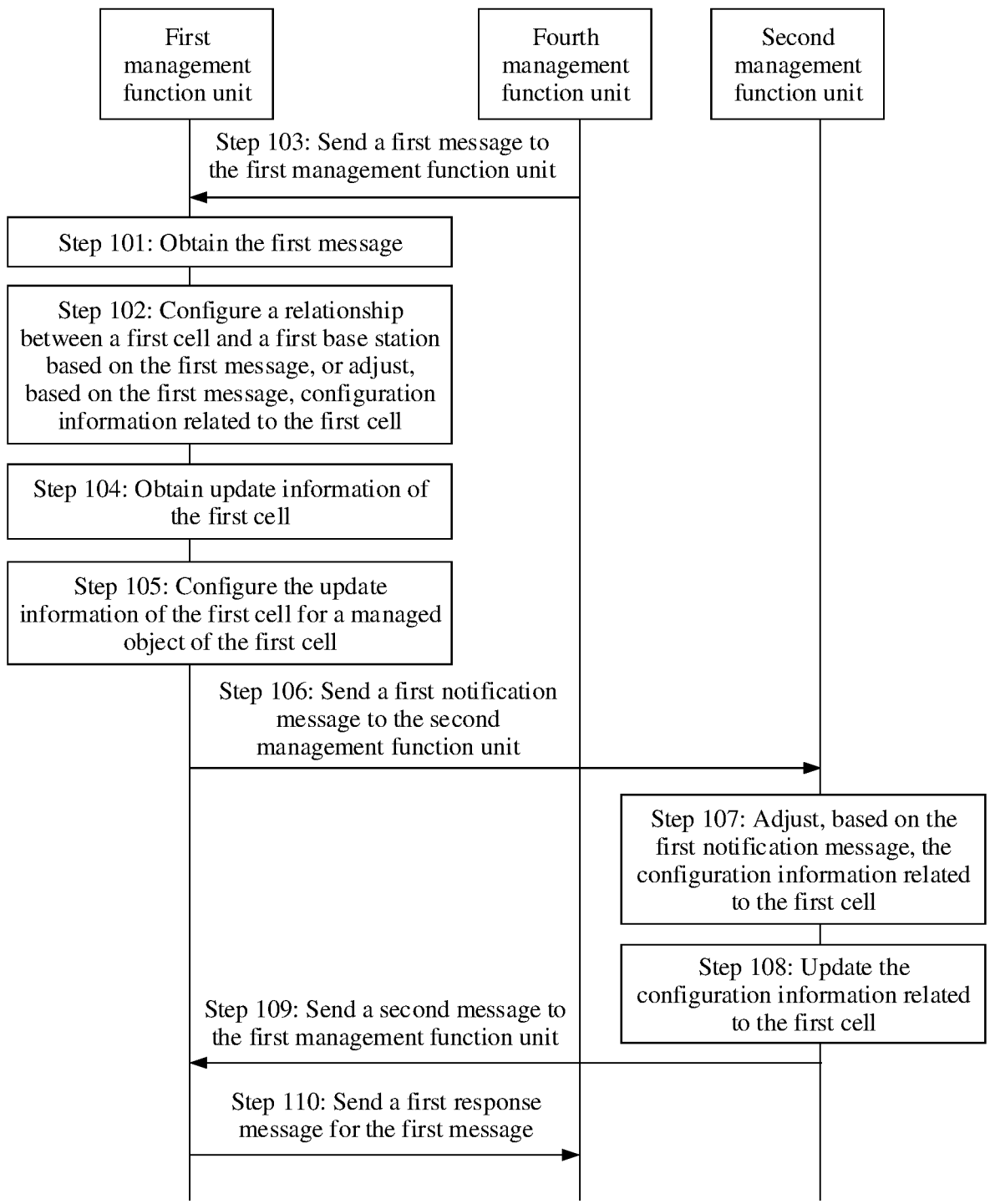
FIG. 7 is a schematic flowchart 2 of a cell configuration method according to an embodiment of this application.

In another embodiment of this application, as shown in FIG. 7, before step 101, the method provided in this embodiment of this application further includes the following steps.

Step 103: A fourth management function unit sends the first message to the first management function unit.

Specifically, if the fourth management function unit (for example, a radio management service consumer in FIG. 2) determines that the first cell needs to be associated with the first base station, step 103 is performed.

Specifically, the fourth management function unit may determine, in the following manner, that the first cell needs to be migrated to the first base station: The fourth management function unit determines that load of a second base station to which the first cell belongs is greater than preset load of the base station, or that a second base station needs to be maintained and reconstructed. In this case, the fourth management function unit determines that the first cell needs to be associated with the first base station.

Preset load of one base station may be configured by a network side for the base station, or may be set by the base station, or may be preconfigured. This is not limited in embodiments of the present disclosure.

It should be understood that, in an embodiment, before the fourth management function unit determines that the first cell needs to be associated with the first base station, the method provided in this embodiment of this application further includes: The fourth management function unit determines that the first management function unit has a scenario-specific configuration capability. The scenario-specific configuration capability may also be referred to as an intent-based configuration capability or an intent-based cell migration capability. The first management function unit having the scenario-specific configuration capability has one or more of a capability of associating a cell with a destination base station from a source base station, a capability of adjusting a neighboring cell relationship associated with the cell, and a capability of adjusting an external cell associated with the cell.

For example, the fourth management function unit may determine the scenario-specific configuration capability of the first management function unit in the following manner. The first management function unit sends, to the fourth management function unit, a first indication that the first management function unit has the scenario-specific configuration capability. In this way, the fourth management function unit may determine, based on the received first indication, that the first management function unit has the scenario-specific configuration capability.

It should be noted that, to ensure that the load of the first base station is not greater than the preset load after the first cell is associated with the first base station, the fourth management function unit may select a base station whose load is less than the preset load as the first base station, or select a base station with a later establishment time in the first management function unit.

If the first message has a function of indicating the first management function unit to configure a relationship between the first cell and the first base station, the fourth management function unit may send information about the first cell and information about the first base station to the first management function unit. For example, the first message is a cell scenario-specific configuration request.

If the first message does not have the function of indicating the first management function unit to configure the relationship between the first cell and the first base station, the fourth management function unit may include first indication information in the first message. The first indication information is used to indicate the first management function unit to configure the relationship between the first cell and the first base station.

Specifically, when both the second base station and the first base station are managed by the first management function unit, the first indication information is specifically used to indicate the first management function unit to associate the first cell with the first base station.

It should be understood that the first indication information is further used to indicate the first management function unit to adjust configuration information related to the first cell. In addition, it may be understood that the first indication information may not only indicate to adjust the configuration information related to the first cell, but also indicate to configure the relationship between the first cell and the first base station. Alternatively, the first indication information indicates to adjust the configuration information related to the first cell. Alternatively, the first indication information indicates to configure the relationship between the first cell and the first base station.

That the first management function unit in step 102 in the scenario 1 configures the relationship between the first cell and the first base station based on the first message may be specifically implemented in the following manner 11 or manner 12:

Manner 11: The first management function unit configures base station information in a managed object of the first cell as the information about the first base station.

It should be understood that a managed object of a cell includes base station information, and the base station information is used to indicate a base station associated with the cell. Therefore, when associating the first cell with the first base station, the first management function unit may configure the base station information in the managed object of the first cell as the information about the first base station. In this way, the first cell may point to the first base station. To be specific, the first management function unit may configure a mapping relationship between the first cell and the first base station by modifying the base station information in the managed object of the first cell to the information about the first base station.

For example, the managed object of the first cell originally includes information about a base station 1, and now the first cell needs to be associated from the base station 1 to a base station 2. In this case, the first management function unit may configure the base station information in the managed object of the first cell as information about the base station 2, so that a relationship between the first cell and the base station 2 is created.

Manner 12: The first management function unit configures a managed object identifier of the first cell as a managed object identifier of a second cell, where the managed object identifier of the second cell includes information about the second base station.

It should be understood that the managed object identifier of the first cell is used to determine the managed object of the first cell (where for content of the managed object of the first cell, refer to the foregoing descriptions), and the managed object identifier of the second cell is used to determine a managed object of the first cell after the first cell is associated with the first base station. It may also be understood that the second cell may be any one of one or more cells covered by the first base station. The second cell may also be a cell that is created and that is covered by the first base station after the first management function unit obtains the first message.

For example, the first base station covers a cell 1, a cell 2, and a cell 3. In a case, the first cell is a cell 1. In another case, the first cell is a cell 5 that is created and that is covered by the first base station.

That the first management function unit in step 102 in the scenario 1 adjusts, based on the first message, the neighboring cell relationship associated with the first cell may be specifically implemented in the following manner 14, manner 15, or manner 16:

Manner 14: The first management function unit creates the external cell associated with the first cell.

For example, the first management function unit creates a managed object of the external cell associated with the first cell. It should be understood that, the created managed object of the external cell associated with the first cell may include the information about the first base station, or includes a managed object identifier that is of a second cell and that is obtained after the first cell is associated with the first base station.

Manner 15: The first management function unit deletes an external cell associated with a neighbor cell of the first cell.

For example, the first management function unit deletes a managed object of the external cell associated with the neighbor cell of the first cell.

Corresponding to the manner 14 and the manner 15, this may be specifically implemented in the following manners: On the one hand, the first management function unit deletes all external cells associated with the neighbor cell of the first cell. For example, there is the external cell associated with the neighbor cell of the first cell or an external cell that is covered by the second base station and that is associated with the neighbor cell of the first cell. If there is a cell that is covered by the second base station and whose neighbor cell is the first cell, the first management function unit creates, under the second base station, the external cell associated with the first cell. On the other hand, the first management function unit deletes all external cells associated with the first cell, and creates, under the first base station, an external cell associated with the neighbor cell of the first cell.

It should be noted that, in this embodiment of this application, creating the external cell associated with the first cell, adjusting the neighboring cell relationship associated with the first cell, or adjusting the external cell associated with the first cell may refer to performing a corresponding operation on a corresponding managed object of the external cell and a managed object of the neighbor cell.

Manner 16: When the managed object identifier of the second cell includes the information about the first base station, the first management function unit configures the managed object identifier of the second cell for a neighbor cell of the first cell.

For example, the first management function unit configures a managed object of the neighbor cell of the first cell, so that the managed object of the neighbor cell of the first cell includes the managed object identifier of the second cell.

Neighbor cells of the first cell include: a cell that is of at least one cell covered by the first base station and that is adjacent to the first cell, a cell that is of at least one cell covered by the second base station and that is adjacent to the first cell, and a cell that is of another base station managed by the first management function unit and that is adjacent to the first cell.

For example, the manner 16 may be specifically implemented in the following manner: The first management function unit associates all neighbor cells that are of the first cell and that are covered by the second base station with the second cell. Specifically, the first management function unit configures information about the second cell for all neighbor cells that are covered by the second base station and that are associated with the first cell (for example, configures the information about the second cell in neighbor cell information of the managed object of the neighbor cell associated with the first cell), where the information about the second cell includes the managed object identifier of the second cell; and/or the first management function unit associates all neighboring cell relationships, that are of cells covered by the first base station and that are associated with the first cell, with the second cell. Specifically, the first management function unit configures neighbor cell information of managed objects of all the neighbor cells that are of the first cell and that are covered by the second base station as the information about the second cell. The information about the second cell includes the managed object identifier of the second cell.

Optionally, the second cell in the specific implementation of the manner 16 is a cell obtained after the first cell is associated with the first base station. It should be understood that the information about the second cell may further include an identifier of the second cell and the information about the first base station.

In an example embodiment, as shown in FIG. 7, the method provided in this embodiment of this application further includes the following steps.

Step 104: The first management function unit obtains update information of the first cell, where the update information of the first cell is used to update a parameter of the first cell.

Optionally, the update information of the first cell includes at least one of a cell logical identifier, a physical cell identifier (PCI), a frequency, a bandwidth, or a tracking area code (TAC). For example, the update information of the first cell includes a cell logical identifier or a physical cell identifier. Alternatively, the update information of the first cell includes a tracking area code. Alternatively, the update information of the first cell includes a cell logical identifier, a physical cell identifier (PCI), a frequency, a bandwidth, or a tracking area code (TAC).

For example, if the first cell is a 4G cell, namely, an EUTAN cell, the frequency is an E-UTRA absolute radio frequency channel number (earfcn), an uplink E-UTRA absolute radio frequency channel number (earfcnUL), or an earfcnDL (Downlink E-UTRA absolute radio frequency channel number).

For example, if the cell is a 5G cell, namely, an NRCell, an NRCellCU, or an NRCellDU, a frequency center point is one or more of an absolute radio frequency channel number (arfcnDL), an uplink absolute radio frequency channel number (arfcnUL), a downlink absolute radio frequency channel number (arfcnDL), or a supplementary uplink absolute radio frequency channel number (arfcnSUL). The bandwidth is one or more of a downlink base station channel bandwidth (bSChannelBwDL), an uplink base station channel bandwidth (bSChannelBwUL), or a supplementary uplink base station channel bandwidth (bSChannelBwSUL).

After the first cell is associated with the first base station, the second base station to which the first cell belongs and the first base station may access different mobility management network elements. Therefore, when the second base station and the first base station are connected to different mobility management network elements, the TAC needs to be carried in the update information of the first cell. It should be understood that, if the second base station and the first base station are connected to a same mobility management network element, the TAC may not be carried in the update information of the first cell.

For example, in a 4G network, the mobility management network element may be a mobility management entity (MME). In a 5G network, the mobility management network element may be an access management function (AMF) network element. For example, the cell logical identifier is used to identify the first cell.

For example, when the first cell is an EutranCell, a logical identifier of the first cell is a cellLocalId, an EutranCell global identifier (ECGI), or an EutranCell identifier (EutranCell Id, ECI). When the first cell is an NRCell, an NRCellCU, or an NRCellDU, a logical identifier of the first cell is a new radio cell global identifier (NR Cell global Id, NCGI) or a new radio cell identifier (NR Cell Id, NCI).

It should be noted that the cellLocalId is unique to a cell covered by a base station. If the first cell is associated with an eNB, the cellLocalId may need to be reassigned. The ECGI and the ECI include an eNB Id. If the first cell is associated with an eNB, the ECGI and the ECI may need to be reassigned. Both the NCGI and the NCI include a gNB Id. If the first cell is associated with a gNB, the NCGI and the NCI may need to be reassigned.

It should be understood that the first management function unit may obtain the update information of the first cell from the third management function unit. The update information of the first cell may be carried in the first message and sent to the first management function unit, or may be sent to the first management function unit by using a message different from the first message. This is not limited in embodiments of the present disclosure.

Step 105: The first management function unit updates the managed object of the first cell based on the update information of the first cell.

Specifically, the first management function unit configures the update information of the first cell for the managed object of the first cell.

It should be understood that the managed object of the first cell in step 105 refers to the managed object of the first cell after the first cell is associated with the first base station.

In addition, in step 105, the method may further include: updating the configuration information related to the first cell. The updating the configuration information related to the first cell includes: The first management function unit configures the update information of the first cell for the neighbor cell associated with the first cell. Alternatively, the first management function unit configures the update information of the first cell for the neighbor cell associated with the first cell. Alternatively, the first management function unit configures the update information of the first cell for the neighbor cell associated with the first cell, and configures the update information of the first cell for the neighbor cell associated with the first cell.

It should be understood that the neighbor cell associated with the first cell and the external cell associated with the first cell herein are the neighbor cell associated with the first cell and the external cell associated with the first cell after the first cell is associated with the first base station.

It should be understood that, in this embodiment of this application, the process of configuring the update information of the first cell is configuring the update information of the first cell for the managed object of the first cell after the first cell is associated with the first base station. Configuring the update information of the first cell for the neighbor cell associated with the first cell, or configuring the update information of the first cell for the external cell associated with the first cell refers to configuring, after the first cell is associated with the first base station, the update information of the first cell for the neighbor cell associated with the first cell, or configuring, after the first cell is associated with the first base station, the update information of the first cell for the external cell associated with the first cell. For example, a cell 1 is originally associated with a base station 1, and a cell 2 is a neighbor cell of the cell 1. After the cell 1 is associated with a base station 2, a management function unit 2 for managing the cell 2 configures information about the base station 2 for the cell 2 under trigger of a management function unit 1 for managing the cell 1 (where the information is used to indicate that the cell 2 is the neighbor cell of the cell 1 associated with the base station 2). If the management function unit 2 further receives update information of the cell 1, the management function unit 2 configures the update information of the cell 1 for the cell 2.

For example, when the first management function unit configures the association relationship between the first cell and the first base station in the foregoing manner 11 or manner 12, the first management function unit configures the update information of the first cell for the managed object of the first cell.

For example, the TAC, the PCI, the frequency, the bandwidth, and the like that are originally included in the managed object of the first cell by the first management function unit may be correspondingly replaced based on information indicated by the update information of the first cell. Details are not repeated herein.

For example, before the association relationship between the first cell and the first base station is configured, the managed object of the first cell include a TAC 1, a frequency 1, and a bandwidth 2.

After the association relationship between the first cell and the first base station is configured, the update information of the first cell includes a TAC 2 and a frequency 2. In this case, the first management function unit may configure the frequency of the first cell in the managed object of the first cell as the frequency 2, and configure the TAC of the first cell as the TAC2.

After the first cell is associated with the first base station, one part of neighbor cells or external cells in the external cells or neighbor cells of the first cell may be managed by the first management function unit, and the other part of neighbor cells or external cells may be managed by the second management function unit. Therefore, in scenario 1, in another embodiment of this application, as shown in FIG. 7, the method provided in this embodiment further includes the following steps.

Step 106: The first management function unit sends a first notification message to the second management function unit, where the first notification message is used to indicate to adjust the configuration information related to the first cell, and the adjusting the configuration information related to the first cell includes: adjusting the external cell associated with the first cell; or adjusting the neighboring cell relationship associated with the first cell.

For example, the first notification message is used to indicate that both the external cell associated with the first cell and the neighboring cell relationship associated with the first cell are adjusted.

The first notification message is used to indicate the second management function unit to adjust the external cell and/or the neighbor cell associated with the first cell.

It should be noted that, if the neighbor cell associated with the first cell and the external cell associated with the first cell are managed by a plurality of second management function units, the first management function unit may send the first notification message to each second management function unit. It should be understood that, that each second management function unit adjusts, based on the first notification message, the external cell and/or the neighbor cell associated with the first cell may be implemented with reference to the following step 107. Details are not repeated below.

In an embodiment, the first notification message further includes the information about the first base station.

Step 107: The second management function unit adjusts, based on the first notification message, the configuration information related to the first cell.

For example, step 107 may be specifically implemented in the following manner 17 and/or manner 18.

Manner 17: The second management function unit associates the external cell associated with the first cell with the second cell.

For example, the second management function unit configures the managed object identifier of the second cell for the external cell associated with the first cell. For example, the second management function unit configures the managed object identifier of the second cell in the managed object of the external cell associated with the first cell. The managed object identifier of the second cell includes the information about the first base station.

Manner 18: The second management function unit associates the neighbor cell associated with the first cell with the second cell.

For example, the second management function unit configures the managed object identifier of the second cell for the neighbor cell associated with the first cell. For example, the second management function unit configures the information about the second cell in the managed object of the neighbor cell of the first cell. The information about the second cell includes the managed object identifier of the second cell.

Optionally, the information about the second cell alternatively includes at least one of the identifier of the second cell or the information about the first base station.

It should be understood that the second cell in the manner 17 and the manner 18 is a cell obtained after the first cell is associated with the first base station.

In an embodiment, the first notification message further includes the update information of the first cell, and the method provided in this embodiment of this application, as shown in FIG. 7, further includes step 108.

Step 108: The second management function unit updates the configuration information related to the first cell. Specifically, the second management function unit configures the update information of the first cell for the external cell associated with the first cell, or configures the update information of the first cell for the neighbor cell associated with the first cell. Alternatively, the second management function unit configures the update information of the first cell for both. The update information of the first cell is used to update the parameter of the first cell.

For example, the second management function unit configures the update information of the first cell in the managed object of the external cell associated with the first cell. The second management function unit configures the update information of the first cell in the managed object of the neighbor cell associated with the first cell.

It may be understood that, after step 108, as shown in FIG. 7, the method provided in this embodiment of this application further includes the following steps.

Step 109: The second management function unit sends a second message to the first management function unit, where the second message is used to indicate that the second management function unit has adjusted the configuration information related to the first cell.

For example, the second message is used to indicate that the external cell associated with the first cell has been adjusted, or the neighbor cell associated with the first cell has been adjusted. Alternatively, the second message is used to indicate that both the external cell associated with the first cell and the neighbor cell associated with the first cell have been adjusted.

Step 110: The first management function unit sends a first response message of the first message to the fourth management function unit, where the first response message is used to indicate that the relationship between the first cell and the first base station has been configured, or the configuration information related to the first cell has been adjusted.

For example, the first response message is used to indicate that the relationship between the first cell and the first base station has been configured. Alternatively, the first response message is used to indicate that the external cell associated with the first cell has been adjusted, or the first response message is used to indicate that the neighbor cell associated with the first cell has been adjusted. Alternatively, the first response message is used to indicate that the relationship between the first cell and the first base station has been configured and that the neighbor cell associated with the first cell has been adjusted. Alternatively, the first response message is used to indicate that the external cell associated with the first cell and the neighbor cell associated with the first cell have been adjusted.

It should be noted that the first response message may be used to indicate that the first management function unit has adjusted the external cell that is associated with the first cell and that is managed by the first management function unit and the neighbor cell associated with the first cell, and that the second management function unit has adjusted the external cell that is associated with the first cell and that is managed by the second management function unit or the neighbor cell associated with the first cell.

For specific content of the update information of the first cell, refer to the descriptions in the foregoing embodiments. Details are not repeated herein.

Figure 8:
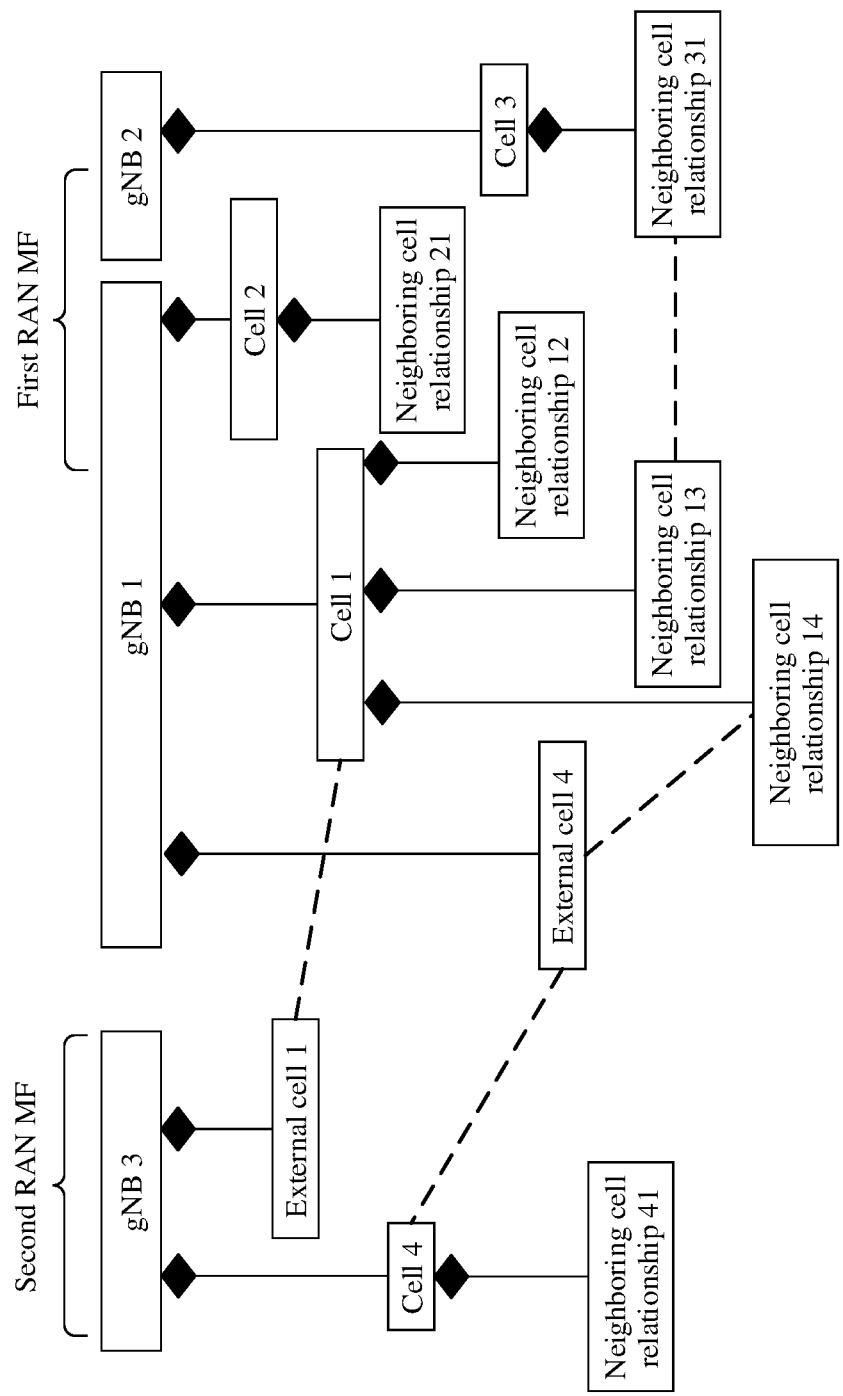
FIG. 8 is a schematic diagram of associating a cell 1 with a gNB 1 according to an embodiment of this application.
Figure 9:
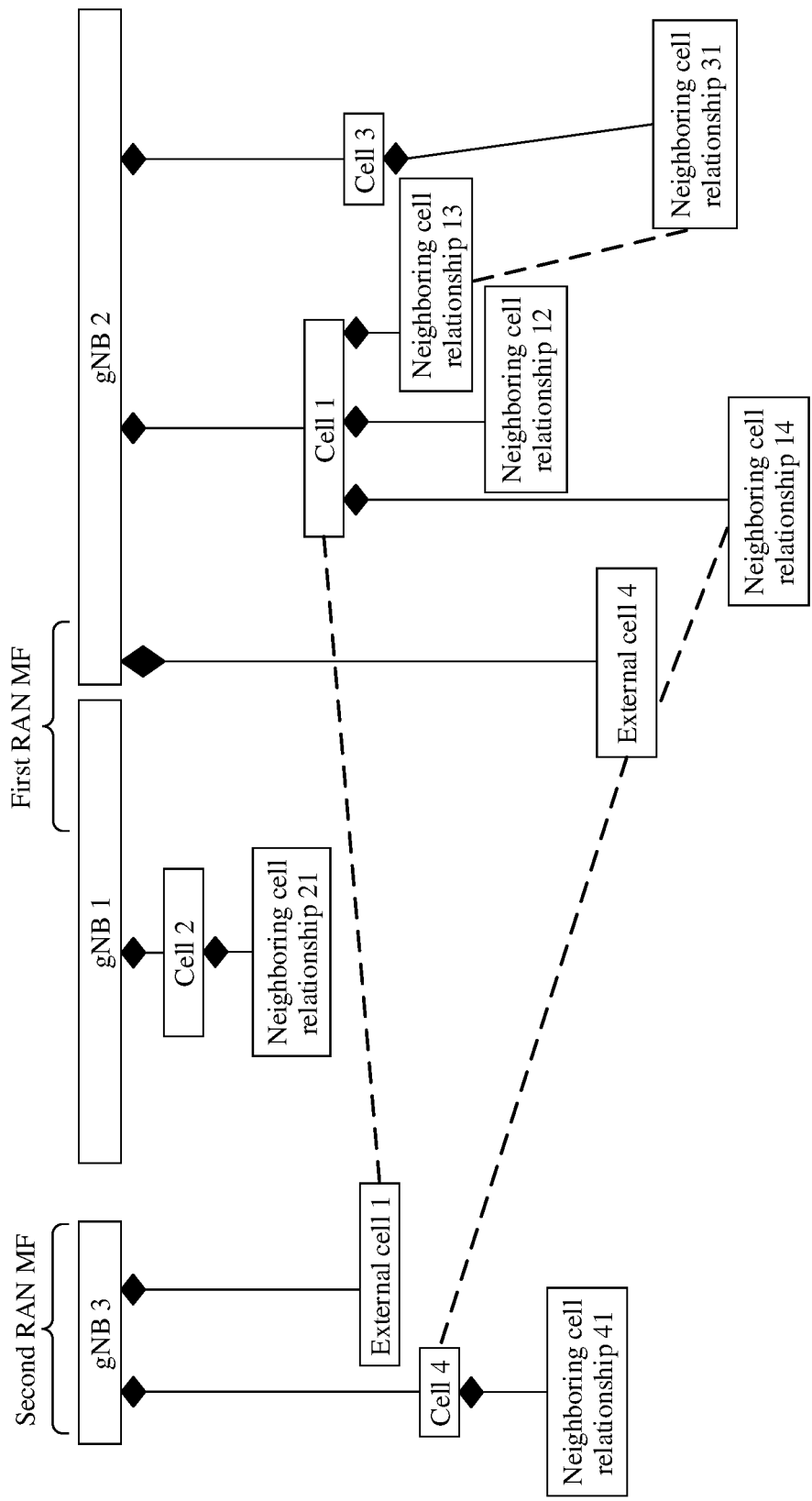
FIG. 9 is a schematic diagram of associating a cell 1 with a gNB 2 according to an embodiment of this application.

FIG. 8 and FIG. 9 are schematic diagrams of specific cell migration according to one or more example embodiments of the present disclosure. FIG. 8 includes a first RAN MF and a second RAN MF. The second RAN MF manages a gNB 3, and the first RAN MF manages a gNB 1 and a gNB 2. It should be understood that an example in which a base station is a gNB is used in FIG. 8.

FIG. 8 shows an example relationship between a cell 1 and each base station and an example relationship between the cell 1 and a cell covered by each base station before the cell 1 is associated with the gNB 2.

As shown in FIG. 8, the gNB 1 is associated with the cell 1 and a cell 2. A cell 3 is associated with the gNB 2. A cell 4 is associated with the gNB 3. The gNB 3 has an external cell 1. The external cell 1 is associated with the cell 1. The cell 1 and the cell 2 are neighbor cells of each other. That the cell 1 has a neighboring cell relationship 12 indicates that the cell 2 is a neighbor cell of cell 1 (where for descriptions related to these below, refer to the descriptions herein.) That the cell 2 has the neighboring cell relationship 12 indicates that the cell 1 is the neighbor cell of the cell 2. The cell 1 and a cell 3 are neighbor cells. The cell 1 has a neighboring cell relationship 13. The cell 1 and a cell 4 are neighbor cells. The cell 4 has a neighboring cell relationship 41. The cell 1 has a neighboring cell relationship 14.

It should be understood that, in FIG. 8, an external cell 4 is associated with the cell 1. The external cell 4 is used to describe information about the cell 4. In this case, the external cell 1 has information about the gNB 1.

The information about the gNB 1 or an identifier of the cell 1 in the gNB 1 is configured in the neighboring cell relationship 41 of the cell 4 in FIG. 8. The information about the gNB 1 or the identifier of the cell 1 in the gNB 1 is configured in a neighboring cell relationship 21 of the cell 2. The information about the gNB 1 or the identifier of the cell 1 in the gNB 1 is configured in a neighboring cell relationship 31 of the cell 3.

In FIG. 9, after a cell 1 is associated with a gNB 2, a relationship between the cell 1 and each base station and a relationship between the cell 1 and a cell covered by each base station are shown in FIG. 9.

The cell 1 is associated with the gNB 2. An external cell 1 is associated with the cell 1 (where it should be noted that, in this case, an identifier of the cell 1 in the gNB 2 or information about the gNB 2 is configured in the external cell 1). The information about the gNB 2 or the identifier of the cell 1 in the gNB 2 is configured in a neighboring cell relationship 31 of a cell 3. The information about the gNB 2 or the identifier of the cell 1 in the gNB 2 is configured in a neighboring cell relationship 41 of a cell 4. The information about the gNB 2 or the identifier of the cell 1 in the gNB 2 is configured in a neighboring cell relationship 21 of a cell 2.

It can be learned by comparing FIG. 8 and FIG. 9 that both the cell 1 and the cell 2 are associated with the gNB 1 in FIG. 8; and in FIG. 9, the cell 2 is associated with a gNB 1 and the cell 1 is associated with the gNB 2.

Figure 10:
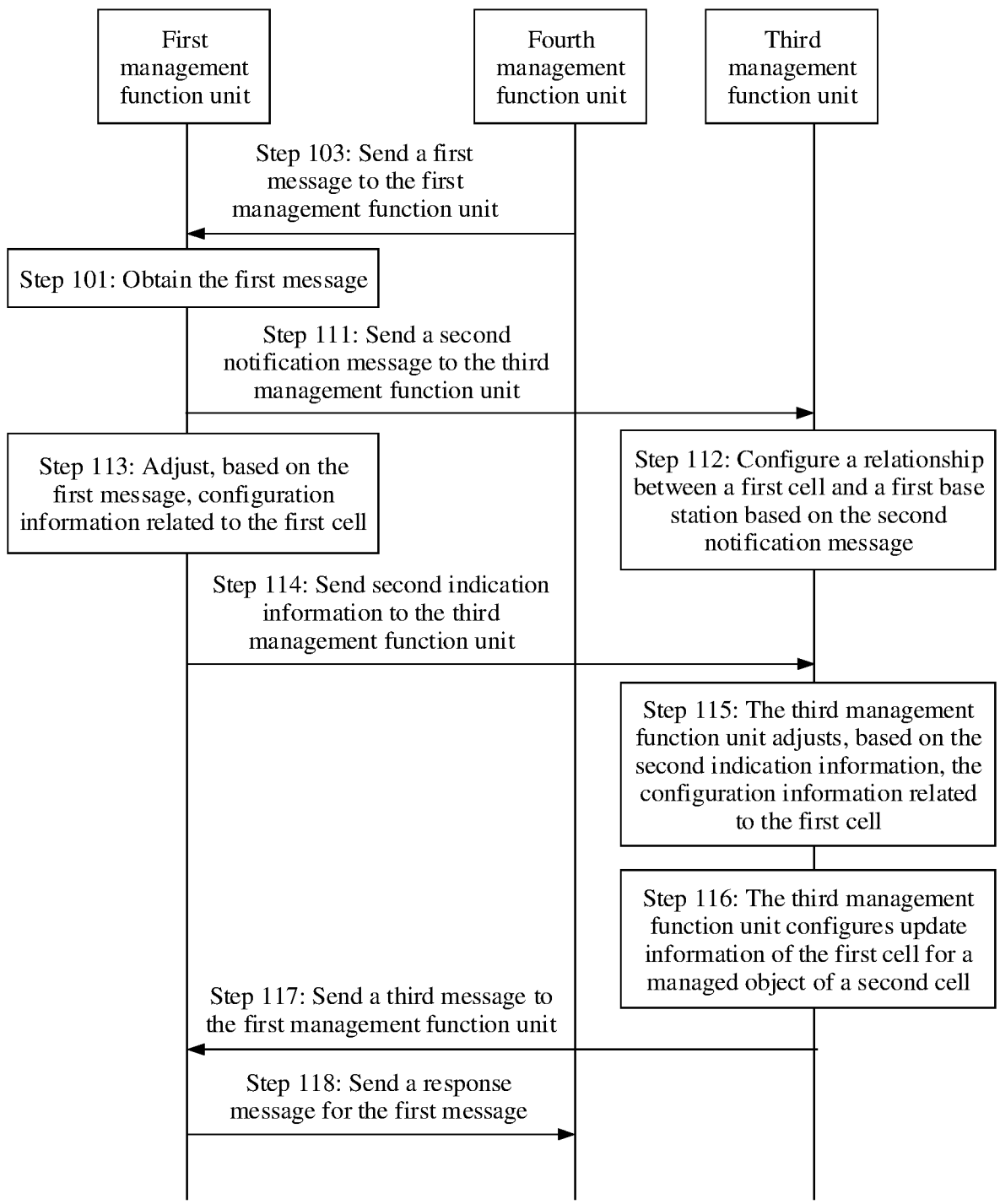
FIG. 10 is a schematic flowchart 3 of a cell configuration method according to an embodiment of this application.

Scenario 2: The first base station is managed by the third management function unit, and the second base station is managed by the first management function unit. In this case, as shown in FIG. 10, based on FIG. 6, the method provided in this embodiment of this application further includes step 103, and step 111 to step 118.

For a specific implementation of step 103, refer to the descriptions in the foregoing embodiment. Details are not repeated herein.

Step 111: The first management function unit sends a second notification message to the third management function unit, where the second notification message includes the information about the first cell and the information about the first base station, or the second notification message includes the information about the first cell and the managed object identifier of the second cell; and the second notification message is used to indicate to configure the relationship between the first cell and the first base station, and the third management function unit is configured to manage the first base station.

It should be understood that, before step 111, the method may further include: The first management function unit determines the third management function unit. For example, a process in which the first management function unit determines the third management function unit may be implemented in the following manner:

On the one hand, if the first management function unit has information about a management function unit corresponding to each base station, after receiving the first message, the first management function unit may determine, based on the information about the management function unit corresponding to each base station in the first management function unit and the information about the first base station carried in the first message, determine a management function unit corresponding to the first base station as the second management function unit.

One the other hand, the first message sent by the fourth management function unit to the first management function unit further carries information about the third management function unit. The information about the third management function unit is used to determine a management function unit corresponding to the first base station, then, the first management function unit may determine, based on the information about the third management function unit, to send the second notification message to the third management function unit.

For example, the information about the third management function unit may be an IP address or an identifier of the third management function unit.

It should be noted that, in the scenario 2, the first indication information is used to indicate the first management function unit to migrate out of the first cell.

The migrating out of the first cell may mean that, because the first base station and the second base station are managed by different management function units, after the first cell is associated with the first base station, for the first management function unit, the first management function unit no longer manages the first cell, but the second management function unit manages the first cell. That is, the first cell managed by the first management function unit is migrated to the second management function unit.

Step 112: The third management function unit configures the relationship between the first cell and the first base station based on the second notification message.

Step 113: The first management function unit adjusts the neighboring cell relationship of the first cell based on the first message. The adjusting configuration information related to the first cell includes: adjusting the external cell associated with the first cell, or adjusting the neighboring cell relationship associated with the first cell. Alternatively, adjusting the configuration information related to the first cell means that both the external cell associated with the first cell and the neighboring cell relationship associated with the first cell need to be adjusted.

It should be noted that for a specific implementation of step 113, refer to the foregoing manner 16 and manner 14. Details are not repeated herein.

It should be understood that, for the manner 16, when the first management function unit adjusts the neighboring cell relationship associated with the first cell or the external cell associated with the first cell, the first management function unit adjusts the cell that is of the at least one cell covered by the second base station and that is adjacent to the first cell to associate with the first base station.

Optionally, the second notification message may further include third indication information, and the third indication information is used to indicate the third management function unit to migrate the first cell from a source base station to a destination base station.

Specifically, when the second notification message is a cell scenario-specific configuration request, the second notification message may not carry the third indication information.

In another embodiment of this application, as shown in FIG. 10, the method provided in this embodiment further includes the following steps.

Step 114: The first management function unit sends second indication information to the third management function unit, where the second indication information is used to indicate to adjust the configuration information related to the first cell, and the adjusting the configuration information related to the first cell includes: adjusting the external cell associated with the first cell; or adjusting the neighboring cell relationship associated with the first cell.

Specifically, the second indication information may be carried in the second notification message, or may be carried in a message different from the second notification message.

Step 115: The third management function unit adjusts the neighboring cell relationship of the first cell based on the second indication information.

For a specific implementation of step 115, refer to one or both of the foregoing manner 14 and manner 16. Details are not repeated herein.

It should be noted that, for the manner 16, that when the third management function unit adjusts the neighboring cell relationship associated with the first cell or the external cell associated with the first cell includes: The third management function unit adjusts the cell that is of the at least one cell covered by the first base station and that is adjacent to the first cell to associate with the first base station.

In addition, it should be further understood that when the third management function unit implements step 112 in the manner 12, the first management function unit further needs to delete the managed object of the first cell.

It should be understood that, if the first management function unit determines that there are the neighbor cell associated with the first cell and the external cell associated with the first cell in the cell managed by the third management function unit, the first management function unit performs step 114, and the third management function unit performs step 115. If the first management function unit determines that there are the neighbor cell associated with the first cell and the external cell associated with the first cell in the cell managed by the third management unit, step 114 and step 115 may be skipped.

Optionally, the second notification message may further carry information about the neighbor cell associated with the first cell and information about the external cell associated with the first cell.

The information about the neighbor cell associated with the first cell is used to determine the neighbor cell associated with the first cell. The information about the external cell associated with the first cell is used to determine the external cell associated with the first cell.

In an embodiment, the second notification message further carries the update information of the first cell. As shown in FIG. 10, the method provided in this embodiment of this application further includes the following step.

Step 116: The third management function unit configures the update information of the first cell for the managed object of the second cell.

Specifically, for the update information of the first cell, refer to the descriptions in the scenario 1.

In addition, the third management function unit updates the configuration information related to the first cell. The updating the configuration information related to the first cell includes: configuring the update information of the first cell for the neighbor cell associated with the first cell, or configuring the update information of the first cell for the external cell associated with the first cell. For this process, refer to the descriptions of step 108. Specifically, the second management function unit in step 108 may be replaced with the third management function unit. Details are not repeated herein.

It should be noted that, in the scenario 2, in addition to the cell covered by the first base station and the cell covered by the second base station, if the neighbor cell associated with the first cell further includes the cell covered by the second management function unit, the foregoing step 106 to step 108 are further included in the scenario 2. It should be understood that, in the scenario 2, the first notification message may be sent by the first management function unit to the second management function unit, or may be sent by the third management function unit to the second management function unit, or may be sent by the fourth management function unit to the second management function unit. This is not limited in embodiments of the present disclosure.

However, it should be noted that, after performing step 106 to step 108, the second management function unit may feed back a response message for a network element (for example, the first management function unit/the third management function unit/the fourth management function unit) that sends the second notification message to the second management function unit, and the response message is used to indicate that the second management function unit has adjusted the configuration information related to the first cell.

It should be understood that, in this embodiment, the first management function unit also needs to configure the update information of the first cell for the neighbor cell associated with the first cell or the external cell associated with the first cell.

In the scenario 2, in an embodiment, as shown in FIG. 10, the method provided in this embodiment further includes the following steps.

Step 117: The third management function unit sends a third message to the first management function unit, where the third message is used to indicate at least one of the following cases: The third management function unit has adjusted the configuration information related to the first cell, or has configured the relationship between the first cell and the first base station.

Step 118: The first management function unit sends a response message for the first message to the fourth management function unit, where the response message is used to indicate at least one of the following cases: The configuration information related to the first cell has been adjusted, or the relationship between the first cell and the first base station has been configured.

Specifically, the response message in step 118 is specifically used to indicate any one of the following cases: The third management function unit has configured the relationship between the first cell and the first base station, the third management function unit has adjusted the neighboring cell relationship associated with the first cell, and the first management function unit has adjusted the external cell associated with the first cell.

In this embodiment of this application, the first management function unit externally provides a cell migration service interface (for example, the first message), so that the first management function unit and the third management function unit may complete migration of the first cell based on the cell migration service interface. In this way, the third management function unit can rapidly implement the migration of the first cell.

Embodiment 2

Figure 11:
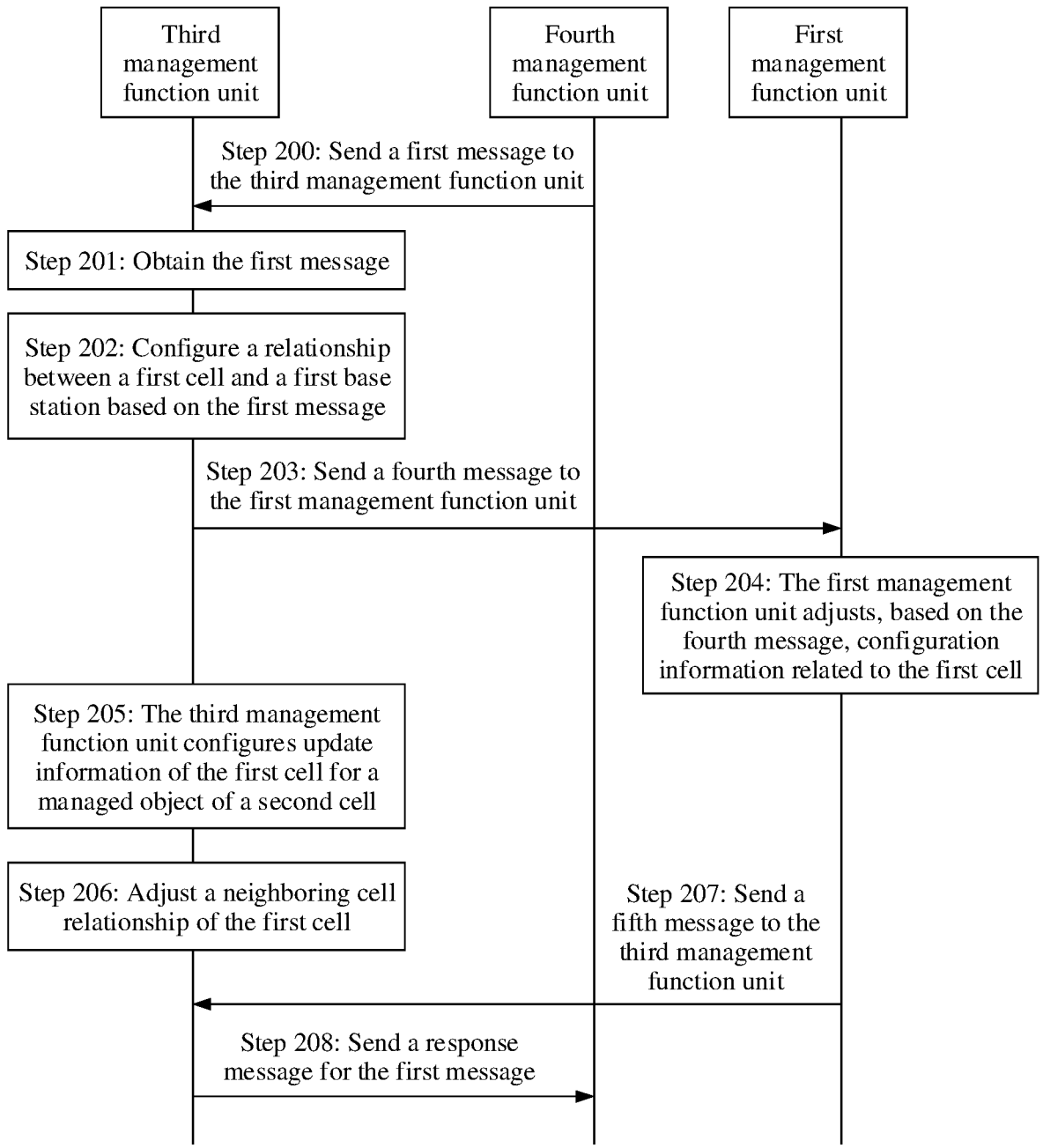
FIG. 11 is a schematic flowchart 4 of a cell configuration method according to an embodiment of this application.

In the foregoing scenario 2, the first message may also be sent by the fourth management function unit to the third management function unit. A specific process is shown in FIG. 11.

Step 201: A third management function unit obtains a first message, where the first message includes information about a first cell and information about a first base station.

Specifically, for content of the first message, refer to the descriptions of the scenario 1 in the foregoing embodiment 1. This is not limited in embodiments of the present disclosure.

It should be understood that the first message is sent by a fourth management function unit to the third management function unit. That is, as shown in FIG. 11, before step 201, the method further includes:

Step 200: The fourth management function unit sends the first message to the third management function unit.

It should be understood that for a specific implementation of step 200, refer to step 103. A difference lies in that a sending object of the first message in step 200 is the third management function unit.

It may be understood that, in the embodiment 2, if the first message further carries first indication information, the first indication information is used to indicate the third management function unit to configure a relationship between the first cell and the first base station. Optionally, the first indication information is further used to indicate the third management function unit to adjust configuration information related to the first cell.

Step 202: The third management function unit configures the relationship between the first cell and the first base station based on the first message.

Specifically, the third management function unit creates a managed object of a second cell, and information about the managed object of the second cell is the same as that about a managed object of the first cell. Then, the third management function unit modifies base station information of the managed object of the second cell to the information about the first base station. In this case, the first management function unit needs to delete the managed object of the first cell.

Step 203: The third management function unit sends a fourth message to the first management function unit, where the fourth message includes the information about the first cell and the information about the first base station.

Specifically, it may be understood that before step 202, the method may further include: The third management function unit determines the first management function unit corresponding to the first cell.

For a specific determining process, refer to the process in which the first management function unit determines the third management function unit in step 111. A difference lies in that in step 200, if the first message further carries information about the first management function unit, the third management function unit may further determine the first management function unit based on the information about the first management function unit.

For example, the information about the first management function unit is used to determine a management function unit corresponding to the first cell. The information about the first management function unit may be at least one of an identifier of the first management function unit and an IP address of the first management function unit.

Specifically, the fourth message is used to indicate the first management function unit to adjust a neighboring cell relationship associated with the first cell, or adjust an external cell associated with the first cell, or adjust both.

Step 204: The first management function unit adjusts the neighboring cell relationship of the first cell based on the fourth message.

For a specific implementation of step 204, refer to the descriptions in step 113. A difference lies in that the first message in step 113 is replaced with the fourth message. Details are not repeated herein.

In an embodiment, the first message further includes update information of the first cell. As shown in FIG. 11, the method provided in this embodiment further includes the following step.

Step 205: The third management function unit configures the update information of the first cell for the managed object of the second cell.

For a specific implementation of step 205, refer to the descriptions in step 116. Details are not repeated herein.

In addition, the third management function unit may further send the update information of the first cell to the first management function unit. In this case, the first management function unit further needs to configure the update information of the first cell for the neighbor cell associated with the first cell or the external cell associated with the first cell. Alternatively, the first management function unit further needs to configure the update information of the first cell for both the neighbor cell associated with the first cell and the external cell associated with the first cell. For a specific implementation process, refer to the process in which the first management function unit updates the configuration information related to the first cell in step 105.

In an example embodiment, as shown in FIG. 11, the method provided in this embodiment of this application further includes the following step.

Step 206: The third management function unit adjusts the configuration information related to the first cell, where the adjusting the configuration information related to the first cell includes: adjusting the neighboring cell relationship associated with the first cell; or adjusting the external cell associated with the first cell.

Specifically, for an implementation of step 206, refer to one or both of the foregoing manner 14 and manner 16. Details are not repeated herein.

In an example embodiment, as shown in FIG. 11, the method provided in this embodiment of this application further includes the following steps.

Step 207: The first management function unit sends a fifth message to the third management function unit, where the fifth message is used to indicate that the first management function unit has adjusted the configuration information related to the first cell.

Step 208: The third management function unit sends a response message for the first message to the fourth management function unit.

The response message for the first message in step 208 is used to indicate that the third management function unit has configured the relationship between the first cell and the first base station, the first management function unit has adjusted the configuration information related to the first cell, and the third management function unit has adjusted the configuration information related to the first cell.

Embodiment 3

Figure 12:
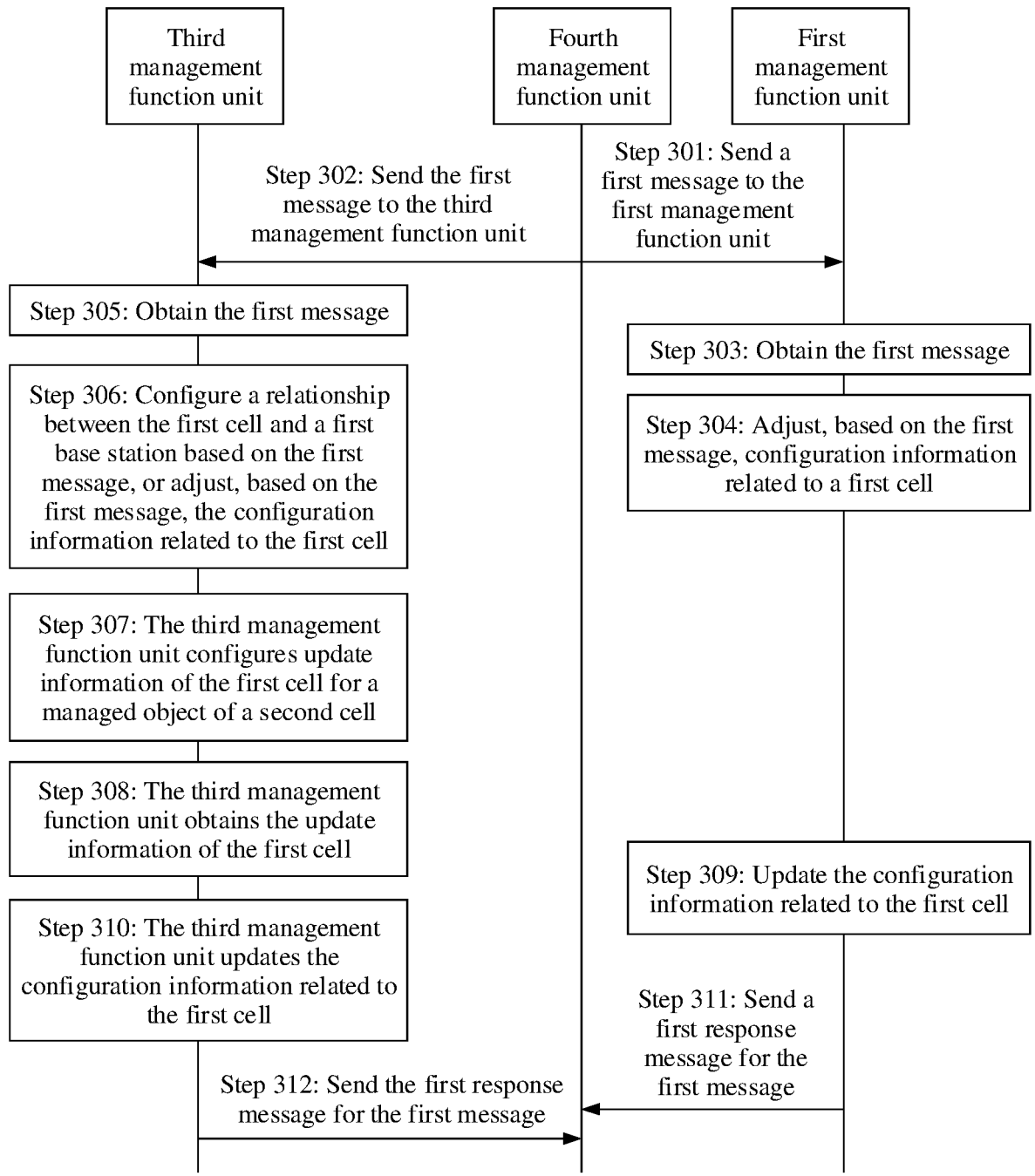
FIG. 12 is a schematic flowchart 5 of a cell configuration method according to an embodiment of this application.

In another embodiment of this application, as shown in FIG. 12, the method provided in this embodiment of this application further includes the following steps.

Step 301: A fourth management function unit sends a first message to a first management function unit.

Step 302: The fourth management function unit sends the first message to the third management function unit.

It should be understood that the first message in step 301 and step 302 includes information about a first cell and information about a first base station.

For the information about the first cell and the information about the first base station, refer to the descriptions in the embodiment 1. Details are not repeated herein.

In step 301, if the first message carries first indication information, the first indication information is used to indicate the first management function unit to migrate out of the first cell. In step 302, if the first message carries the first indication information, the first indication information is used to indicate the third management function unit to migrate to the first cell.

Step 303: The first management function unit obtains the first message.

Step 304: The first management function unit adjusts, based on the first message, configuration information related to the first cell.

For a specific implementation process of step 304, refer to the descriptions in step 113. Details are not repeated herein.

Step 305: The third management function unit obtains the first message.

Step 306: The third management function unit configures a relationship between the first cell and the first base station based on the first message.

In addition, if the first message received by the third management function unit further includes the first indication information, and the first indication information is used to indicate the third management function unit to adjust a neighboring cell relationship associated with the first cell, or adjust an external cell associated with the first cell, or adjust both, the third management function unit adjusts, based on the first indication information, the configuration information related to the first cell.

Specifically, for an implementation of step 306, refer to the descriptions in step 112 and step 115. Details are not repeated herein.

In still another embodiment, when the first message further carries update information of the first cell, and the update information of the first cell is used to update a parameter of the first cell, as shown in FIG. 12, the method provided in this embodiment further includes the following steps.

Step 307: The third management function unit configures the update information of the first cell for a managed object of a second cell.

For a specific implementation of step 307, refer to the descriptions in step 116. Details are not repeated herein.

Step 308: The third management function unit obtains the update information of the first cell.

It should be understood that the external cell associated with the first cell and the neighbor cell associated with the first cell in step 308 refer to the external cell associated with the first cell and the neighbor cell associated with the first cell that are managed by the third management function unit.

Step 309: The first management function unit updates the configuration information related to the first cell, where the updating the configuration information related to the first cell includes: configuring the update information of the first cell for the external cell associated with the first cell; or configuring the update information of the first cell for the neighbor cell of the first cell, where the update information of the first cell is used to update the parameter of the first cell.

It should be understood that the external cell associated with the first cell and the neighbor cell associated with the first cell in step 309 refer to the external cell associated with the first cell and the neighbor cell associated with the first cell that are managed by the first management function unit.

Step 310: The third management function unit configures the update information of the first cell in a managed object of the external cell associated with the first cell or the neighbor cell associated with the first cell, where the update information of the first cell is used to update the parameter of the first cell.

It should be understood that the external cell/neighbor cell associated with the first cell in step 310 is managed by the third management function unit.

Specifically, for specific implementations of step 309 and step 310, refer to step 108. Details are not repeated herein.

In another example embodiment, as shown in FIG. 12, the method provided in this embodiment further includes the following steps.

Step 311: The first management function unit sends a response message for the first message to the fourth management function unit.

It should be understood that the response message for the first message in step 311 is used to indicate that the first management function unit has adjusted the configuration information related to the first cell.

Step 312: The third management function unit sends the response message for the first message to the fourth management function unit.

It should be understood that the response message for the first message in step 312 is used to indicate that the third management function unit has adjusted the configuration information related to the first cell and has configured the relationship between the first cell and the first base station.

It should be noted that, in this embodiment, if the migrated cell does not have a neighbor cell or an external cell, the processes in which each management function network element in the foregoing embodiment adjusts the external cell and/or the neighbor cell associated with the first cell, and configures the update information of the first cell for the external cell and/or the neighbor cell may be skipped.

It should be noted that, in the embodiment 1 to the embodiment 3, after any management function unit configures the update information of the first cell for the neighbor cell associated with the first cell, the external cell associated with the first cell, or the managed object of the first cell, the management function unit may alternatively send indication information used to indicate that the update information of the first cell has been configured.

Figure 13:
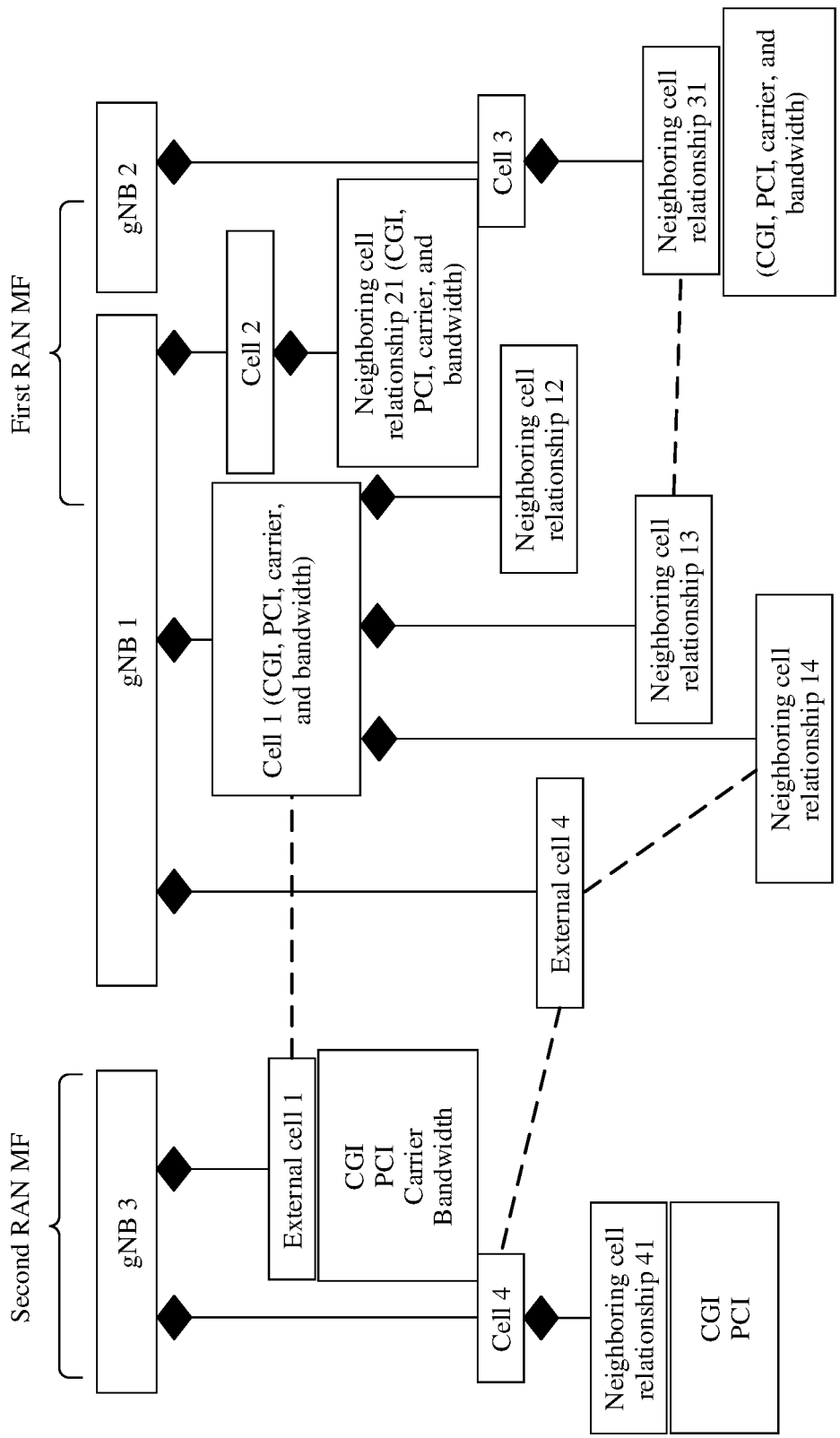
FIG. 13 is a schematic diagram of cell configuration update information according to an embodiment of this application.

FIG. 13 is a schematic diagram of configuring update information of a cell 1 for a neighbor cell associated with the cell 1 and an external cell associated with the cell 1. The update information of the cell 1 includes a CGI, a PCI, a carrier, and a bandwidth. In this case, a first RAN MF configures the CGI, the PCI, the carrier, and the bandwidth for the cell 1.

For example, a cell 2 is a neighbor cell associated with the cell 1. Therefore, the first RAN MF configures the CGI, the PCI, the carrier, and the bandwidth in a neighboring cell relationship 21 of the cell 2.

For example, an external cell 1 is an external cell associated with the cell 1. In this case, a second RAN MF configures the CGI, the PCI, the carrier, and the bandwidth for the external cell 1.

A cell 3 is a neighbor cell of the cell 1. Therefore, the first RAN MF configures the CGI, the PCI, the carrier, and the bandwidth in a neighboring cell relationship 31 of the cell 3.

The foregoing mainly describes the solutions in the embodiments of this application from a perspective of interaction between the network elements. It may be understood that to implement the foregoing functions, the network elements such as a service flow processing apparatus and a communications apparatus include corresponding hardware structures and/or software modules for performing the functions. A person skilled in the art should understand that, with reference to the examples described in the embodiments disclosed in this specification, units and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, division into function units may be performed on the service flow processing apparatus and the communications apparatus based on the foregoing method examples. For example, the function units may be obtained through division based on corresponding functions, or two or more functions may be integrated into one processing unit. The integrated unit may be implemented in a form of hardware, or may be implemented in a form of a software function unit. It should be noted that in the embodiments of this application, division into the units is an example and is merely logical function division. There may be another division manner during actual implementation.

Figure 14:
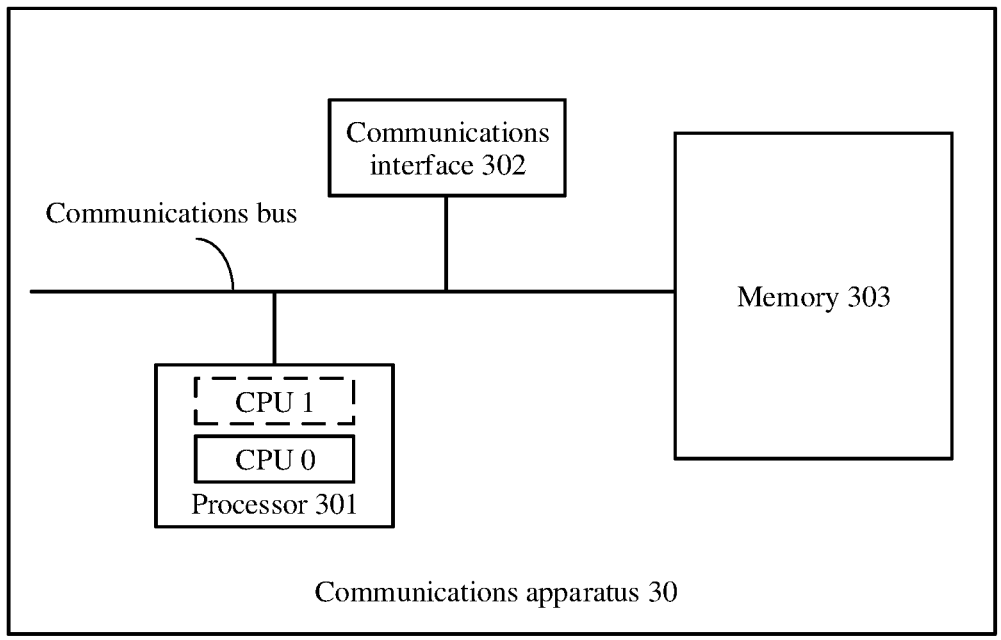
FIG. 14 is a schematic diagram of a communications apparatus according to an embodiment of this application.

FIG. 14 is a schematic diagram of a hardware structure of a communications apparatus according to an embodiment of this application. The communications apparatus 30 may be a first management function unit or a second management function unit, or a third management function unit or a fourth management function unit in the following. The communications apparatus 30 includes at least one processor 301 and at least one communications interface 302, and may further include a memory 303. In FIG. 14, an example in which the communications apparatus 30 includes at least one processor 301, the memory 303, and one communications interface 302 is used for illustration. The communications interface in this embodiment may alternatively be replaced with a transceiver pin, a transceiver, or the like.

The communications interface 302, the at least one processor 301, and the memory 303 communicate with each other through a communications bus. The at least one processor 301 is configured to execute instructions to control the communications interface 302 to send or receive a signal. The memory 303 is configured to store the instructions. When executing the instructions, the at least one processor 301 performs the method described below.

The at least one processor 301 may be one or more general-purpose central processing units (central processing unit, CPU), microprocessors, application-specific integrated circuits (application-specific integrated circuit, ASIC), or one or more integrated circuits configured to control program execution of the solutions in this application. The at least one processor 301 may be one or more single-core (single-CPU) processors, and/or one or more multi-core (multi-CPU) processors. The processor herein may refer to one or more devices, circuits, and/or processing cores configured to process data (for example, computer program instructions). In an embodiment, the at least one processor 301 may include one or more CPUs, for example, a CPU 0 and a CPU 1 in FIG. 14.

The communications interface 302 is configured to communicate with another device or a communications network.

The memory 303 is configured to store computer-executable instructions for executing the solutions in this application, and the at least one processor 301 controls the execution of the computer-executable instructions. The at least one processor 301 is configured to execute the computer-executable instructions stored in the memory 303, to implement the method provided in the following embodiments of this application, for example, perform actions of a first base station management unit or a second base station management unit below. The memory 303 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a blue-ray optical disc, and the like), a magnetic disk storage medium or another magnetic storage device, or any other medium that is capable of carrying or storing expected program code in a form of instructions or a data structure and that can be accessed by a computer, but this is not limited in embodiments of the present disclosure.

Optionally, the computer-executable instructions in this embodiment may also be referred to as application program code. This is not specifically limited in embodiments of this application.

An example in which each function module is obtained through division based on each corresponding function is used below for description.

Figure 15:
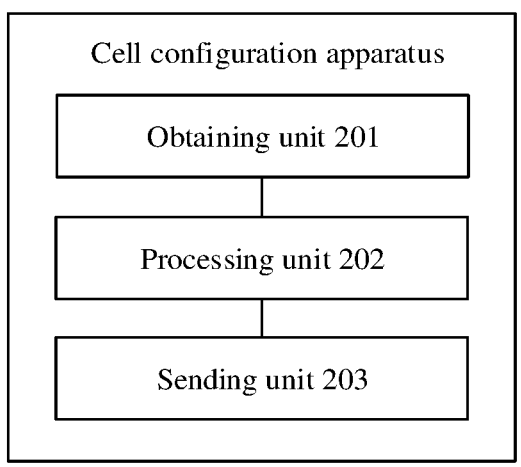
FIG. 15 is a schematic structural diagram 1 of a cell configuration apparatus according to an embodiment of this application.

When an integrated unit is used, FIG. 15 is a possible schematic structural diagram of a cell configuration apparatus in the foregoing embodiment. The cell configuration apparatus may be a first management function unit, or a chip used in a first management function unit. The cell configuration apparatus includes an obtaining unit 201 and a processing unit 202.

In an example embodiment, the obtaining unit 201 is configured to support the cell configuration apparatus in performing step 101 in the foregoing embodiment. The processing unit 202 is configured to support a service flow processing apparatus in performing step 102 in the foregoing embodiment.

In an embodiment, the cell configuration apparatus includes a sending unit 203.

In an example, the sending unit 203 is configured to support the cell configuration apparatus in performing step 106 and step 110 in the foregoing embodiments.

In another example, the sending unit 203 is configured to support the cell configuration apparatus in performing step 111, step 114, and step 118 in the foregoing embodiments.

In another embodiment, the obtaining unit 201 is configured to obtain a fourth message, and the processing unit 202 is configured to perform step 204. Optionally, the sending unit 203 is configured to support the cell configuration apparatus in performing step 207 in the foregoing embodiment.

In yet another embodiment, the obtaining unit 201 is configured to perform step 303 in the foregoing embodiment, and the processing unit 202 is configured to perform step 304 and step 309. Optionally, the sending unit 203 is configured to support the cell configuration apparatus in performing step 301 in the foregoing embodiment.

All related content of the steps in the foregoing method embodiments may be cited in function descriptions of the corresponding function modules. Details are not repeated herein.

When the cell configuration apparatus shown in FIG. 15 may be a third management function unit, or may be a chip used in a third management function unit, the following embodiments may be provided.

In a first embodiment, the obtaining unit 201 is configured to support the cell configuration apparatus in performing the step of obtaining the second notification message in the foregoing embodiment, the processing unit 202 is configured to support the service flow processing apparatus in performing step 112, step 115, and step 116 in the foregoing embodiment, and the processing unit 203 is configured to support the service flow processing apparatus in performing steps 117 in the foregoing embodiment.

In a second embodiment, the obtaining unit 201 is configured to support the cell configuration apparatus in performing step 201 in the foregoing embodiment, the processing unit 202 is configured to support the service flow processing apparatus in performing step 202, step 205, and step 206 in the foregoing embodiment, and the sending unit 203 is configured to support the service flow processing apparatus in performing step 203 and step 208 in the foregoing embodiment.

In a third embodiment, the obtaining unit 201 is configured to support the cell configuration apparatus in performing step 305 in the foregoing embodiment, the processing unit 202 is configured to support the service flow processing apparatus in performing step 306, step 307, and step 308 in the foregoing embodiment, and the processing unit 203 is configured to support the service flow processing apparatus in performing steps 312 in the foregoing embodiment.

Figure 16:
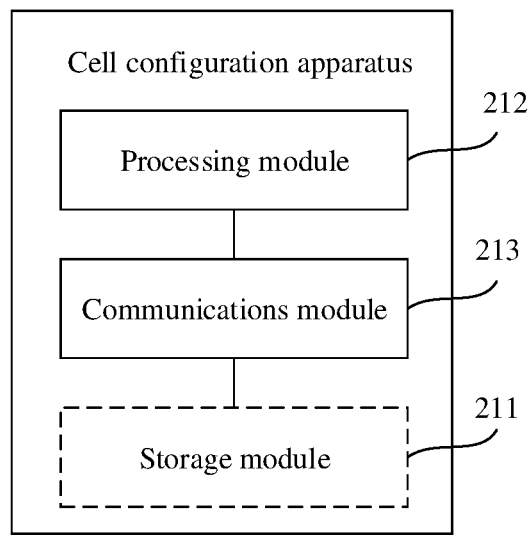
FIG. 16 is a schematic structural diagram 2 of a cell configuration apparatus according to an embodiment of this application.

When an integrated unit is used, FIG. 16 is a schematic diagram of an example logical structure of a cell configuration apparatus in the foregoing embodiment. The cell configuration apparatus may be a first management function unit, or a chip used in a first management function unit in the foregoing embodiment. The cell configuration apparatus includes a processing module 212 and a communications module 213. The processing module 212 is configured to control and manage an action of the cell configuration apparatus. For example, the processing module 212 is configured to perform a step of processing a message or data on a side of the cell configuration apparatus, and the communications module 213 is configured to perform a step of processing a message or data on the side of the cell configuration apparatus.

For example, the processing module 212 is configured to support the cell configuration apparatus in performing step 102 in the foregoing embodiment. On the one hand, the communications module 213 is configured to support the cell configuration apparatus in performing step 101, step 106, and step 110 in the foregoing embodiment. On the other hand, the communications module 213 is configured to support the cell configuration apparatus in performing step 101, step 111, step 114, and step 118 in the foregoing embodiment, and/or is configured to perform another process performed by the cell configuration apparatus in the technology described in this specification.

Optionally, the cell configuration apparatus may further include a storage module 211, configured to store program code and data of the cell configuration apparatus.

The processing module 212 may be a processor or controller, for example, may be a central processing unit, a general-purpose processor, a digital signal processor, an application-specific integrated circuit, a field-programmable gate array or another programmable logic device, a transistor logic device, a hardware component, or any combination thereof. The processing module 212 may implement or execute various example logical blocks, modules, and circuits described with reference to content disclosed in the present invention. Alternatively, the processor may be a combination of processors implementing a computing function, for example, a combination of one or more microprocessors, or a combination of a digital signal processor and a microprocessor. The communications module 213 may be a communications interface, a transceiver, a transceiver circuit, an interface circuit, or the like. The storage module 211 may be a memory.

When the processing module 212 is the processor 301, the communications module 213 is the communications interface 302, the interface circuit, or the transceiver, and the storage module 211 is the memory 303, the cell configuration apparatus in this application may be a device shown in FIG. 14.

The communications interface 302, one or more (including two) processors 301, and the memory 303 are connected to each other through a communications bus.

The processor 301 is configured to support the cell configuration apparatus in performing step 102.

On the one hand, the communications interface 302 supports the cell configuration apparatus in performing step 101, step 106, and step 110. On the other hand, the communications interface 302 supports the cell configuration apparatus in performing step 101, step 111, step 114, and step 118 in the foregoing embodiment.

Figure 17:
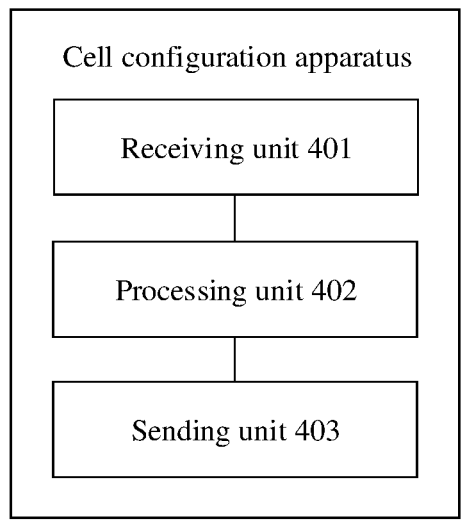
FIG. 17 is a schematic structural diagram 3 of a cell configuration apparatus according to an embodiment of this application.

When an integrated unit is used, FIG. 17 is a possible schematic structural diagram of a cell configuration apparatus in the foregoing embodiment. The cell configuration apparatus may be a second management function unit, or a chip used in a second management function unit. The cell configuration apparatus includes a receiving unit 401 and a processing unit 402.

The receiving unit 401 is configured to support the cell configuration apparatus in performing the step of obtaining the first notification message in the foregoing embodiment.

The processing unit 402 is configured to support the cell configuration apparatus in performing step 107 and step 108 in the foregoing embodiment.

Optionally, the cell configuration apparatus shown in FIG. 17 may further include a sending unit 403, configured to support the cell configuration apparatus in performing step 109 in the foregoing embodiment.

Figure 18:
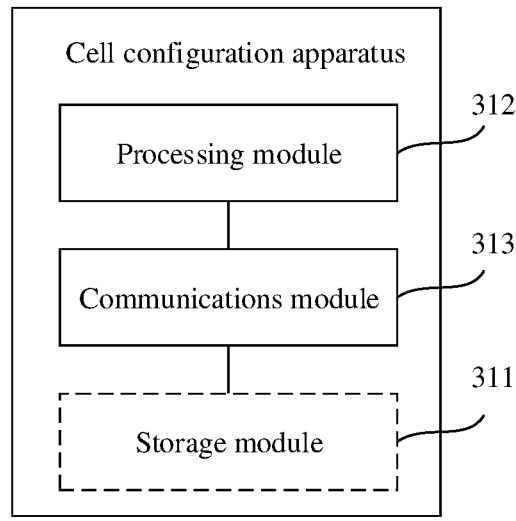
FIG. 18 is a schematic structural diagram 4 of a cell configuration apparatus according to an embodiment of this application.

When an integrated unit is used, FIG. 18 is a schematic diagram of a possible logical structure of a cell configuration apparatus in the foregoing embodiment. The cell configuration apparatus may be a second management function unit, or a chip used in a second management function unit in the foregoing embodiment. The cell configuration apparatus includes a processing module 312 and a communications module 313. The processing module 312 is configured to control and manage an action of the cell configuration apparatus, and the communications module 313 is configured to perform a step of processing a message or data on a side of the cell configuration apparatus.

For example, the communications module 313 is configured to support the cell configuration apparatus in performing the step of obtaining the first notification message and step 109 in the foregoing embodiment. The processing module 312 is configured to support the cell configuration apparatus in performing step 107 and step 108 in the foregoing embodiment, and/or is configured to perform another process performed by the communications apparatus in the technology described in this specification.

Optionally, the cell configuration apparatus may further include a storage module 311, configured to store program code and data of the cell configuration apparatus.

The processing module 312 may be a processor or controller, for example, may be a central processing unit, a general-purpose processor, a digital signal processor, an application-specific integrated circuit, a field-programmable gate array or another programmable logic device, a transistor logic device, a hardware component, or any combination thereof. The processing module 312 may implement or execute various example logical blocks, modules, and circuits described with reference to content disclosed in the present invention. Alternatively, the processor may be a combination of processors implementing a computing function, for example, a combination of one or more microprocessors, or a combination of a digital signal processor and a microprocessor. The communications module 313 may be a communications interface, a transceiver, a transceiver circuit, an interface circuit, or the like. The storage module 311 may be a memory.

When the processing module 312 is the processor 301, the communications module 313 is the communications interface 302, the interface circuit 330, or the transceiver, and the storage module 311 is the memory 303, the cell configuration apparatus in this application may be a device shown in FIG. 14.

In an embodiment, the interface circuit 330 is configured to support the step of obtaining the first notification message and step 109. The interface circuit 330 is configured to support the cell configuration apparatus in performing step 107 and step 108 in the foregoing embodiment, and/or is configured to perform another process performed by the cell configuration apparatus in the technology described in this specification.

It should be noted that in the embodiments, the receiving unit or the obtaining unit (or a unit used for receiving/obtaining) is an interface circuit of the apparatus, and is configured to receive a signal from another apparatus. For example, when the apparatus is implemented in a form of a chip, the receiving unit is an interface circuit that is of the chip and that is configured to receive a signal from another chip or apparatus. The sending unit or the transmission unit (or a unit used for sending/transmission) is an interface circuit of the apparatus, and is configured to send a signal to another apparatus. For example, when the apparatus is implemented in a form of a chip, the sending unit is an interface circuit that is of the chip and that is configured to send a signal to another chip or apparatus. The processing unit or the determining unit in the embodiments is a processor of the apparatus, and is configured to process a received signal or process a signal of the apparatus. For example, when the apparatus is implemented in a form of a chip, the processing unit or the determining unit is a processor that is of the chip and that is configured to process a signal received from another chip or apparatus.

Figure 19:
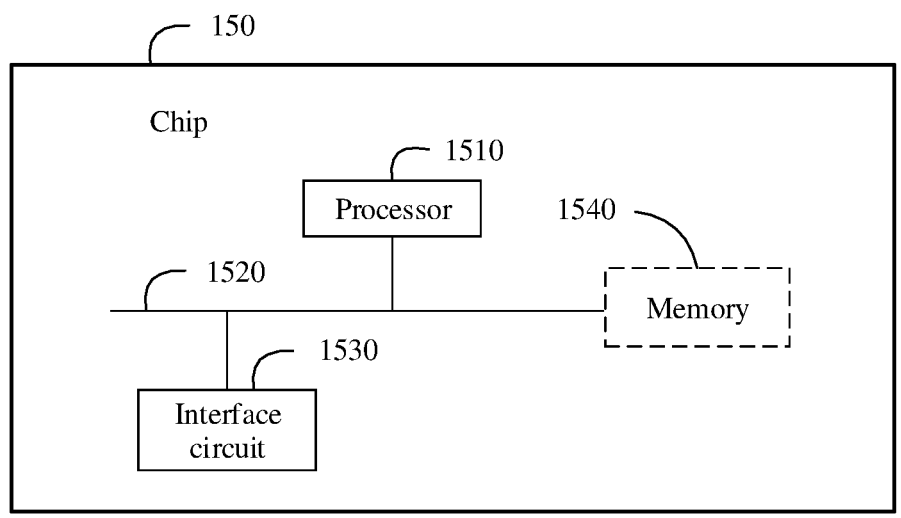
FIG. 19 is a schematic structural diagram of a chip according to an embodiment of this application.

FIG. 19 is a schematic structural diagram of a chip 150 according to an embodiment of the present invention. The chip 150 includes one or more (including two) processors 1510 and an interface circuit 1530.

Optionally, the chip 150 further includes a memory 1540. The memory 1540 may include a read-only memory and a random access memory, and provide operation instructions and data for the processor 1510. A part of the memory 1540 may further include a non-volatile random access memory (NVRAM).

In some implementations, the memory 1540 stores the following elements: an executable module or a data structure, or a subset thereof, or an extension set thereof.

In this embodiment of the present invention, a corresponding operation is performed by invoking the operation instructions (where the operation instructions may be stored in an operating system) stored in the memory 1540.

In an embodiment, a communications apparatus and a communications capability determining apparatus use a similar chip structure, and different apparatuses may use different chips to implement respective functions.

The processor 1510 controls operations of the communications apparatus and the communications capability determining apparatus. The processor 1510 may also be referred to as a central processing unit (CPU). The memory 1540 may include a read-only memory and a random access memory, and provide instructions and data for the processor 1510. A part of the memory 1540 may further include a non-volatile random access memory (NVRAM). For example, during application, the processor 1510, the interface circuit 1530, and the memory 1540 are coupled together through a bus system 1520. The bus system 1520 may further include a power bus, a control bus, a status signal bus, and the like in addition to a data bus. However, for clear description, various types of buses in FIG. 19 are marked as the bus system 1520.

The method disclosed in the foregoing embodiments of the present invention may be applied to the processor 1510, or implemented by the processor 1510. The processor 1510 may be an integrated circuit chip and has a signal processing capability. In an implementation process, steps in the foregoing method may be implemented by using a hardware integrated logical circuit in the processor 1510, or by using instructions in a form of software. The processor 1510 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor may implement or perform the methods, steps, and logical block diagrams that are disclosed in the embodiments of the present invention. The general-purpose processor may be a microprocessor, or the processor may be any conventional processor or the like. The steps of the methods disclosed with reference to the embodiments of the present invention may be directly performed and completed by a hardware decoding processor, or performed and completed by a combination of hardware and a software module in a decoding processor. The software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps in the foregoing methods in combination with hardware of the processor 1510.

In an embodiment, the interface circuit 1530 is configured to perform receiving and sending steps of the first management function unit, the second management function unit, the third management function unit, and the fourth management function unit in the embodiments shown in FIG. 5, FIG. 6, FIG. 7, and FIG. 10. The processor 1510 is configured to perform processing steps of the first management function unit, the second management function unit, the third management function unit, and the fourth management function unit in the embodiments shown in FIG. 5, FIG. 6, FIG. 7, and FIG. 10.

In the foregoing embodiments, the instructions that are stored in the memory and that are to be executed by the processor may be implemented in a form of a computer program product. The computer program product may be written into the memory in advance, or may be downloaded in a form of software and installed in the memory.

The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

According to an aspect of an embodiment, a computer-readable storage medium is provided. The computer-readable storage medium stores instructions. When the instructions are run, a first management function unit or a chip used in a first management function unit is enabled to perform step 101, step 102, step 104, step 105, step 106, step 111, step 114, and step 118 in the embodiment, and/or another process that is used for the technology described in this specification and that is performed by the first management function unit or the chip used in the first management function unit.

According to another aspect of an embodiment, a computer-readable storage medium is provided. The computer-readable storage medium stores instructions. When the instructions are run, a first management function unit or a chip used in a first management function unit is enabled to perform the step of obtaining a fourth message, step 204, and step 207 in the embodiment, and/or another process that is used for the technology described in this specification and that is performed by the first management function unit or the chip used in the first management function unit.

According to still another aspect of an embodiment, a computer-readable storage medium is provided. The computer-readable storage medium stores instructions. When the instructions are run, a first management function unit or a chip used in a first management function unit is enabled to perform step 303, step 304, step 309, and step 311 in the embodiment, and/or another process that is used for the technology described in this specification and that is performed by the first management function unit or the chip used in the first management function unit.

According to still another aspect of an embodiment, a computer-readable storage medium is provided. The computer-readable storage medium stores instructions. When the instructions are run, a second management function unit or a chip used in a second management function unit is enabled to perform step 107, step 108, and step 109 in the embodiment, and/or another process that is used for the technology described in this specification and that is performed by the second management function unit or the chip used in the second management function unit.

According to yet another aspect of an embodiment, a computer-readable storage medium is provided. The computer-readable storage medium stores instructions. When the instructions are run, a third management function unit or a chip used in a third management function unit is enabled to perform step 112, step 115, step 116, and step 117 in the embodiment, and/or another process that is used for the technology described in this specification and that is performed by the third management function unit or the chip used in the third management function unit.

According to yet another aspect of an embodiment, a computer-readable storage medium is provided. The computer-readable storage medium stores instructions. When the instructions are run, a third management function unit or a chip used in a third management function unit is enabled to perform step 201, step 202, step 203, step 205, step 206, and step 208 in the embodiment, and/or another process that is used for the technology described in this specification and that is performed by the third management function unit or the chip used in the third management function unit.

The foregoing readable storage medium may include any medium that can store program code, such as a USB flash drive, a removable hard disk, a read-only memory, a random access memory, a magnetic disk, or an optical disc.

According to an aspect of an embodiment, a computer program product including instructions is provided. The computer program product stores the instructions. When the instructions are run, a first management function unit or a chip used in a first management function unit is enabled to perform step 101, step 102, step 104, step 105, step 106, step 111, step 114, and step 118 in the embodiment, and/or another process that is used for the technology described in this specification and that is performed by the first management function unit or the chip used in the first management function unit.

According to another aspect of an embodiment, a computer program product including instructions is provided. The computer program product stores the instructions. When the instructions are run, a first management function unit or a chip used in a first management function unit is enabled to perform the step of obtaining a fourth message, step 204, and step 207 in the embodiment, and/or another process that is used for the technology described in this specification and that is performed by the first management function unit or the chip used in the first management function unit.

According to another aspect of an embodiment, a computer program product including instructions is provided. The computer program product stores the instructions. When the instructions are run, a first management function unit or a chip used in a first management function unit is enabled to perform step 303, step 304, step 309, and step 311 in the embodiment, and/or another process that is used for the technology described in this specification and that is performed by the first management function unit or the chip used in the first management function unit.

According to another aspect of an embodiment, a computer program product including instructions is provided. The computer program product stores the instructions. When the instructions are run, a second management function unit or a chip used in a second management function unit is enabled to perform step 107, step 108, and step 109 in the embodiment, and/or another process that is used for the technology described in this specification and that is performed by the second management function unit or the chip used in the second management function unit.

According to still another aspect, an embodiment of this application provides a computer program product including instructions. The computer program product stores the instructions. When the instructions are run, a third management function unit or a chip used in a third management function unit is enabled to perform step 112, step 115, step 116, and step 117 in the embodiment, and/or another process that is used for the technology described in this specification and that is performed by the third management function unit or the chip used in the third management function unit.

According to still another aspect, an embodiment of this application provides a computer program product including instructions. The computer program product stores the instructions. When the instructions are run, a third management function unit or a chip used in a third management function unit is enabled to perform step 201, step 202, step 203, step 205, step 206, and step 208 in the embodiment, and/or another process that is used for the technology described in this specification and that is performed by the third management function unit or the chip used in the third management function unit.

According to an aspect of an embodiment, a chip is provided. The chip is used in a first management function unit, the chip includes one or more (including two) processors and an interface circuit, the interface circuit is interconnected to the one or more (including two) processors through a line, and the processor is configured to run instructions to perform step 101, step 102, step 104, step 105, step 106, step 111, step 114, and step 118 in the embodiment, and/or another process that is used for the technology described in this specification and that is performed by the first management function unit or the chip used in the first management function unit.

According to still another aspect of an embodiment, a chip is provided. The chip is used in a first management function unit, the chip includes one or more (including two) processors and an interface circuit, the interface circuit is interconnected to the one or more (including two) processors through a line, and the processor is configured to run instructions to perform the step of obtaining a fourth message, step 204, and step 207 in the embodiment, and/or another process that is used for the technology described in this specification and that is performed by the first management function unit or the chip used in the first management function unit.

According to yet another aspect of an embodiment, a chip is provided. The chip is used in a first management function unit, the chip includes one or more (including two) processors and an interface circuit, the interface circuit is interconnected to the one or more (including two) processors through a line, and the processor is configured to run instructions to perform step 303, step 304, step 309, and step 311 in the embodiment, and/or another process that is used for the technology described in this specification and that is performed by the first management function unit or the chip used in the first management function unit.

According to another aspect of an embodiment, a chip is provided. The chip is used in a second management function unit, the chip includes one or more (including two) processors and an interface circuit, the interface circuit is interconnected to the one or more (including two) processors through a line, and the processor is configured to run instructions to perform step 107, step 108, and step 109 in the embodiment, and/or another process that is used for the technology described in this specification and that is performed by the second management function unit or the chip used in the second management function unit.

According to yet another aspect of an embodiment, a chip is provided. The chip is used in a third management function unit, the chip includes one or more (including two) processors and an interface circuit, the interface circuit is interconnected to the one or more (including two) processors through a line, and the processor is configured to run instructions to perform step 112, step 115, step 116, and step 117 in the embodiment, and/or another process that is used for the technology described in this specification and that is performed by the third management function unit or the chip used in the third management function unit.

According to yet another aspect of an embodiment, a chip is provided. The chip is used in a third management function unit, the chip includes one or more (including two) processors and an interface circuit, the interface circuit is interconnected to the one or more (including two) processors through a line, and the processor is configured to run instructions to perform step 201, step 202, step 203, step 205, step 206, and step 208 in the embodiment, and/or another process that is used for the technology described in this specification and that is performed by the third management function unit or the chip used in the third management function unit.

All or some of the foregoing embodiments may be implemented by software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, the term "comprising" does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the spirit and scope of this application. Correspondingly, the specification and the accompanying drawings are merely example descriptions of this application defined by the appended claims, and are intended to cover any of or all modifications, variations, combinations, or equivalents within the scope of this application. It is clear that a person skilled in the art can make various modifications and variations to this application without departing from the spirit and scope of this application. This application is intended to cover these modifications and variations of this application provided that they fall within the scope of the claims of this application and their equivalent technologies.

What is claimed is:
1. A cell configuration method, comprising:
obtaining, by a first management function unit managing a first base station and a second base station, a first message from a fourth management function unit when the fourth management function unit determines that a first cell associated with the second base station needs to be associated with the first base station, wherein the fourth management function unit manages one or more base stations, the first message comprises information about the first cell and information about the first base station, the information about the first cell comprises at least one of an identifier of the first cell or a managed object identifier of the first cell, and the information about the first base station comprises at least one of an identifier of the first base station or a managed object identifier of the first base station, wherein the managed object identifier of the first cell is an identifier of a managed object of the first cell and the managed object identifier of the first base station is an identifier of a managed object of the first base station; and
configuring, by the first management function unit, a relationship between the first cell and the first base station based on the first message, or adjusting, based on the first message, configuration information related to the first cell, wherein adjusting the configuration information related to the first cell comprises: adjusting a neighboring cell relationship associated with the first cell, or adjusting an external cell associated with the first cell, and the external cell is information associated with the first cell and comprises information describing another cell that is a neighbor cell of the first cell and is covered by the second base station,
wherein the first cell is associated with the second base station before being associated with the first base station.

2. The method according to claim 1, wherein configuring the relationship between the first cell and the first base station comprises:
- configuring, by the first management function unit, base station information in the managed object of the first cell as the information about the first base station; or
- configuring, by the first management function unit, the managed object identifier of the first cell as a managed object identifier of a second cell, wherein the managed object identifier of the second cell is an identifier of a managed object of the second cell and comprises the information about the first base station.

3. The method according to claim 2, wherein adjusting the configuration information related to the first cell comprises:
- creating, by the first management function unit, the external cell associated with the first cell; or
- deleting, by the first management function unit, an external cell associated with the neighbor cell of the first cell; or
- upon determination that the managed object identifier of the second cell comprises the information about the first base station, configuring, by the first management function unit, the managed object identifier of the second cell for a neighbor cell of the first cell.

4. The method according to claim 1, wherein the first message further comprises first indication information, and the first indication information indicates to configure the relationship between the first cell and the first base station, or adjust the configuration information related to the first cell.

5. The method according to claim 2, further comprising:
- sending, by the first management function unit, a first notification message to a second management function unit, wherein the first notification message carries the information about the first cell and at least one of: the managed object identifier of the second cell or update information of the first cell; and the first notification message indicates to adjust the configuration information related to the first cell, and adjusting the configuration information related to the first cell comprises: adjusting the external cell associated with the first cell, or adjusting the neighboring cell relationship associated with the first cell.

6. The method according to claim 2, further comprising:
- sending, by the first management function unit, a second notification message to a third management function unit, wherein the second notification message comprises the information about the first cell and the information about the first base station, or the second notification message comprises the information about the first cell and the managed object identifier of the second cell; and the second notification message indicates to configure the relationship between the first cell and the first base station, the third management function unit is configured to manage the first base station, and the second cell is associated with the first base station.

7. The method according to claim 1, further comprising:
- sending, by the first management function unit, a response message of the first message, wherein the response message indicates that the relationship between the first cell and the first base station has been configured, or the configuration information related to the first cell has been adjusted.

8. A cell configuration method, comprising:
- receiving, by a second management function unit managing one or more base stations, a first notification message from a first management function unit after the first management function unit configures a relationship between a first cell and a first base station or adjusts a neighboring cell relationship or an external cell associated with the first cell, wherein the first management function unit manages the first base station and a second base station, the external cell is information associated with the first cell and comprises information describing another cell that is a neighbor cell of the first cell and is covered by the second base station, the first notification message carries information about a first cell, and the information about the first cell comprises at least one of an identifier of the first cell or a managed object identifier of the first cell, wherein the managed object identifier of the first cell is an identifier of a managed object of the first cell; and
- adjusting, by the second management function unit based on the first notification message, configuration information related to the first cell, wherein adjusting the configuration information related to the first cell comprises: adjusting a neighboring cell relationship associated with the first cell, or adjusting the external cell associated with the first cell.

9. The method according to claim 8, wherein the first notification message further carries at least one of information about a first base station and a managed object identifier of a second cell, and the managed object identifier of the second cell is an identifier of a managed object of the second cell, and
adjusting the configuration information related to the first cell comprises:
- configuring, by the second management function unit, the managed object identifier of the second cell for the external cell associated with the first cell; or
- configuring, by the second management function unit, the managed object identifier of the second cell for a neighbor cell of the first cell.

10. The method according to claim 8, wherein the first notification message further comprises update information of the first cell, and the method further comprises:
- updating, by the second management function unit, the configuration information related to the first cell, wherein updating the configuration information related to the first cell comprises: configuring the update information of the first cell for the external cell associated with the first cell; or configuring the update information of the first cell for a neighbor cell of the first cell, wherein the update information of the first cell is used to update a parameter of the first cell.

11. The method according to claim 10, wherein the update information of the first cell comprises at least one of a cell logical identifier, a physical cell identifier, a frequency, a bandwidth, or a tracking area code.

12. The method according to claim 8, wherein the first notification message further comprises second indication information, and the second indication information indicates to adjust the configuration information related to the first cell; and adjusting the configuration information related to the first cell comprises: adjusting the external cell associated with the first cell, or adjusting the neighboring cell relationship associated with the first cell.

13. A cell configuration apparatus managing a first base station and a second base station, comprising:
- at least one processor; and
- a non-transitory computer-readable storage medium coupled to the at least one processor and storing programming instructions, that when executed by the at least one processor, cause the at least one processor to:

obtain a first message from a fourth management function unit when the fourth management function unit determines that a first cell associated with the second base station needs to be associated with the first base station, wherein the fourth management function unit manages one or more base stations, the first message comprises information about the first cell and information about the first base station, the information about the first cell comprises at least one of an identifier of the first cell or a managed object identifier of the first cell, and the information about the first base station comprises at least one of an identifier of the first base station or a managed object identifier of the first base station, wherein the managed object identifier of the first cell is an identifier of a managed object of the first cell and the managed object identifier of the first base station is an identifier of a managed object of the first base station; and configure a relationship between the first cell and the first base station based on the first message, or adjust, based on the first message, configuration information related to the first cell, wherein adjusting the configuration information related to the first cell comprises: adjusting a neighboring cell relationship associated with the first cell, or adjusting an external cell associated with the first cell, and the external cell is information associated with the first cell and comprises information describing another cell that is a neighbor cell of the first cell and is covered by the second base station, wherein the first cell is associated with a second base station before being associated with the first base station.

14. The apparatus according to claim 13, wherein the programming instructions, when executed by the at least one processor, further cause the at least one processor to configure base station information in the managed object of the first cell as the information about the first base station; or configure the managed object identifier of the first cell as a managed object identifier of a second cell, wherein the managed object identifier of the second cell is an identifier of a managed object of the second cell and comprises the information about the first base station.

15. The apparatus according to claim 14, wherein the programming instructions, when executed by the at least one processor, further cause the at least one processor to create the external cell associated with the first cell, or delete an external cell associated with a neighbor cell of the first cell; or upon determination that the managed object identifier of the second cell comprises the information about the first base station, configure the managed object identifier of the second cell for the neighbor cell of the first cell.

16. The apparatus according to claim 13, wherein the first message further comprises:

first indication information, wherein the first indication information indicates to: configure the relationship between the first cell and the first base station, adjust the configuration information related to the first cell, or adjust the external cell associated with the first cell.

17. The apparatus according to claim 14, wherein the programming instructions, when executed by the at least one processor, further cause the at least one processor:

to send a first notification message to a second management function unit, wherein the first notification message carries the information about the first cell and at least one of: the managed object identifier of the second cell or update information of the first cell, the first notification message indicates to adjust the configuration information related to the first cell, and the update information of the first cell is used to update a parameter of the first cell; and to adjust the external cell associated with the first cell, or adjust the neighboring cell relationship associated with the first cell.

18. The apparatus according to claim 14, wherein the programming instructions, when executed by the at least one processor, further cause the at least one processor to send a second notification message to a third management function unit, wherein the second notification message comprises the information about the first cell and the information about the first base station, or the second notification message comprises the information about the first cell and the managed object identifier of the second cell; and wherein the second notification message indicates to configure the relationship between the first cell and the first base station, the third management function unit is configured to manage the first base station, and the second cell is associated with the first base station.

19. The apparatus according to claim 13, wherein the programming instructions, when executed by the at least one processor, further cause the at least one processor to send a response message of the first message, wherein the response message indicates that the relationship between the first cell and the first base station has been configured, or the configuration information related to the first cell has been adjusted.

20. The cell configuration method according to claim 1, wherein the fourth management function unit determines that the first cell associated with the second base station needs to be associated with the first base station upon determining that load of the second base station is greater than preset load of the second base station, or that the second base station needs to be maintained and reconstructed.

* * * * *

UNITED STATES PATENT AND TRADEMARK OFFICE
CERTIFICATE OF CORRECTION

PATENT NO. : 12,028,756 B2
APPLICATION NO. : 17/213289
DATED : July 2, 2024
INVENTOR(S) : Ruiyue Xu It is certified that error appears in the above-identified patent and that said Letters Patent is hereby corrected as shown below:

In the Specification

Column 13, Line 17, change "The character 'I'" to --The character "/"--

Signed and Sealed this
Thirtieth Day of July, 2024

Katherine Kelly Vidal
*Director of the United States Patent and Trademark Office*